United States Patent
Furuyama

(10) Patent No.: US 6,816,993 B1
(45) Date of Patent: Nov. 9, 2004

(54) CONTROL METHOD OF ELECTRONIC DEVICE CONTROLLABLE FROM EXTERNAL CONTROL APPARATUS BY COMMUNICATION

(75) Inventor: Hiroaki Furuyama, Tachikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/443,650

(22) Filed: Nov. 19, 1999

(30) Foreign Application Priority Data

Nov. 25, 1998 (JP) .......................................... 10-333838

(51) Int. Cl.$^7$ .............................. H04L 1/08; H04N 7/64
(52) U.S. Cl. ........................... 714/747; 700/21; 700/79
(58) Field of Search ........................... 714/6–7, 11, 747; 700/21, 54, 71, 79–82

(56) References Cited

U.S. PATENT DOCUMENTS

| | | | |
|---|---|---|---|
| 4,854,164 A | * 8/1989 | Rhoads ..................... | 73/152.29 |
| 5,243,428 A | * 9/1993 | Challapali et al. .......... | 714/747 |
| 5,699,485 A | * 12/1997 | Shoham ...................... | 714/747 |
| 6,055,497 A | * 4/2000 | Hallkvist et al. ........... | 714/747 |
| 6,463,339 B1 | * 10/2002 | Vasko ......................... | 700/21 |
| 6,510,527 B1 | * 1/2003 | Woerner et al. .............. | 714/5 |

FOREIGN PATENT DOCUMENTS

JP       5-35616 A   *  7/1991   .......... G06F/13/00

* cited by examiner

*Primary Examiner*—R. Stephen Dildine
(74) *Attorney, Agent, or Firm*—Morgan & Finnegan LLP

(57) ABSTRACT

A video camera having a control target which can be controlled by an external control apparatus via communication, and a control method of the video camera. In first memory of the video camera, predetermined standard control data for the control target is stored. When communication is established with an external control apparatus, control data from the external control apparatus is temporarily stored in second memory, and it is determined whether or not a communication error has occurred in the communication with the external control apparatus. If no error is detected in the determination, the control data stored in the second memory is stored in the third memory, but if an error is detected, the control data stored in the second memory is deleted, and the control target is controlled based on the control data stored in the third memory or predetermined standard data stored in the first memory.

47 Claims, 29 Drawing Sheets

Prior Art

FIG. 4A

| PC COMMAND | COMMAND MEANING |
|---|---|
| PC START | PC MODE START (COMMAND TRANSFER START) |
| AE MODE | PROGRAM AUTOMATIC EXPOSURE MODE SELECTION |
| DIGITAL ZOOM | ELECTRONIC ZOOMING MAXIMUM MAGNIFICATION SETTING, PERMIT / PROHIBIT ELECTRONIC ZOOMING |
| ZOOMING POSITION | ZOOMING POSITION SETTING |
| ZOOM | ZOOMING DRIVING DIRECTION AND DRIVING SPEED SETTING |
| FOCUS | FOCUSING DRIVING DIRECTION AND DRIVING SPEED SETTING |
| FOCUSING MODE | AUTO-FOCUS / MANUAL FOCUS SELECTION |
| FOCUSING POSITION | FOCUSING POSITION SETTING |
| GAMMA | GAMMA CHARACTERISTIC SETTING FOR EACH OF Y/R/G/B |
| GAIN | AGC GAIN SETTING |
| IMAGE STABILIZER | VIBRATION ISOLATION EFFECTIVE LEVEL SETTING, ON / OFF SELECTION |
| IRIS | EXPOSURE CORRECTION AUTO / MANUAL SETTING, F-VALUE SETTING |
| SETUP LEVEL | SETUP LEVEL SETTING FOR EACH OF Y/R/G/B |
| SHUTTER | SHUTTER SPEED SETTING |
| WHITE BALANCE | WHITE BALANCE AUTO / SET / PRESET SELECTION |
| AE SHIFT | APERTURE OPENING DIAMETER SHIFT |
| AE LOCK | EXPOSURE CORRECTION AUTO / LOCK SELECTION |
| COLOR GAIN | COLOR SATURATION ADJUSTMENT |
| TINT (HUE) | HUE ADJUSTMENT |
| ⋮ | ⋮ |
| PC END | PC MODE END (SERIES OF COMMAND TRANSFER END) |

FIG. 4B

| No. | CATEGORY | PC COMMAND |
|---|---|---|
| 1 | | PC START (PC MODE START) |
| 2 | BASIC PERFORMANCE / BASIC SETTING COMMAND | AE MODE (PROGRAM AE MODE SELECTION) |
| 3 | | FOCUSING POSITION (FOCUSING POSITION SETTING) |
| ⋮ | | ⋮ |
| 11 | SMALL ADJUSTMENT COMMAND | TINT (HUE) (HUE ADJUSTMENT) |
| 12 | | COLOR GAIN (COLOR SATURATION ADJUSTMENT) |
| ⋮ | | ⋮ |
| ⋮ | | PC END (PC MODE END) |

Prior Art

Prior Art

Prior Art

CABLE CROSS SECTION

Prior Art

EXCLUSIVE-OR OF Data AND Strobe

Prior Art

BRANCH : NODE TO WHICH TWO OR MORE NODES ARE CONNECTED

LEAF : NODE HAVING ONLY ONE PORT CONNECTED

☐ : PORT
c : PORT THAT CORRESPONDING TO NODE OF CHILD
p : PORT THAT CORRESPONDING TO NODE OF PARENT

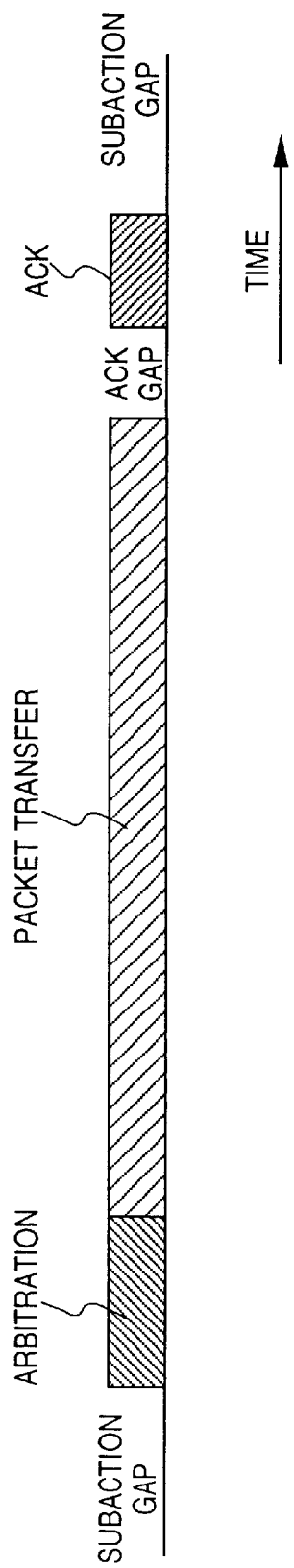

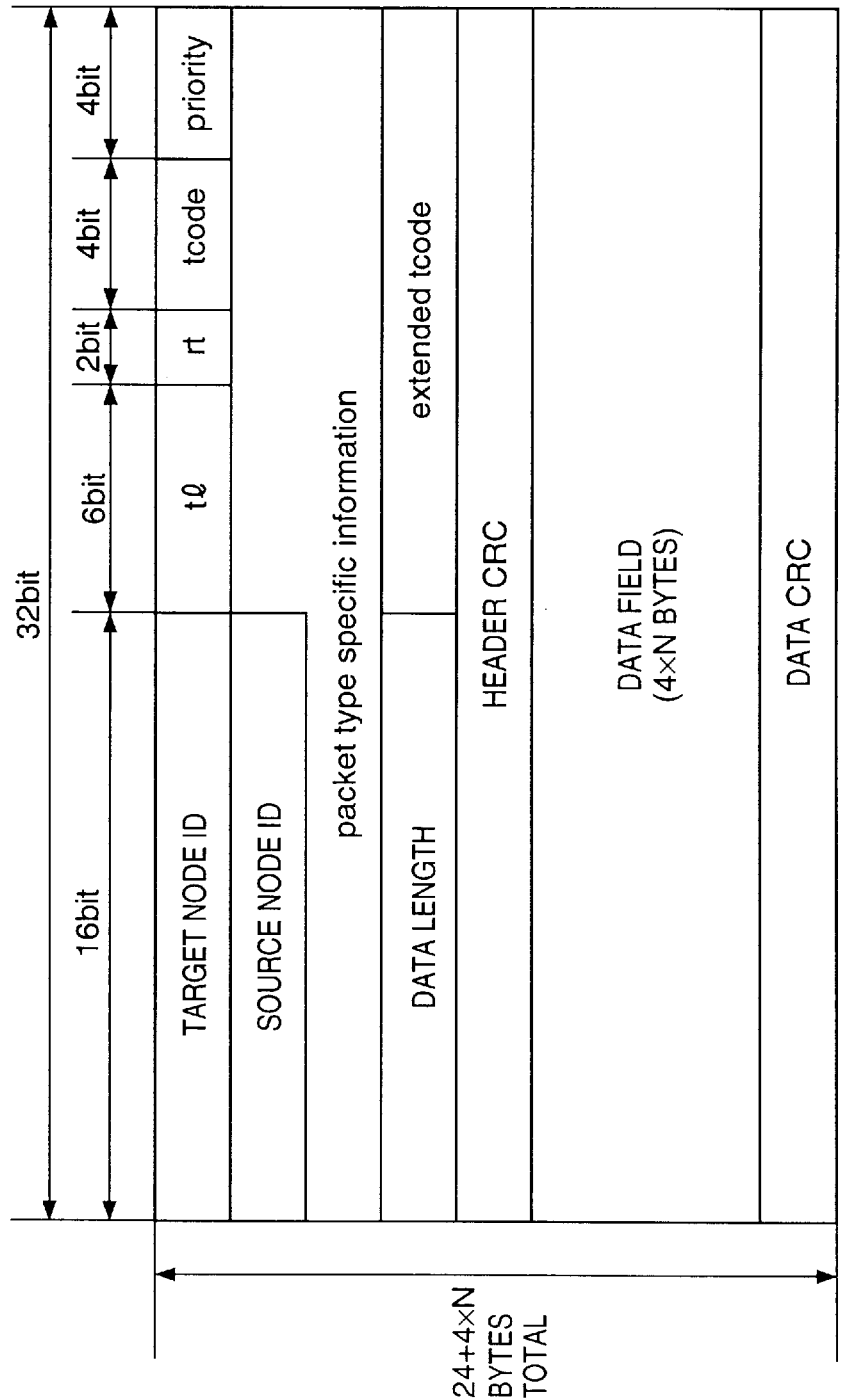

CONTROL METHOD OF ELECTRONIC DEVICE CONTROLLABLE FROM EXTERNAL CONTROL APPARATUS BY COMMUNICATION

BACKGROUND OF THE INVENTION

The present invention relates to an electronic device, such as a video camera or the like, which is preferably utilized in a system controlling the electronic device from a personal computer through a network, and a computer-readable storage medium used in the electronic device.

Conventionally, peripherals of a personal computer (hereinafter referred to as a PC) such as hard disk or a printer or the like are connected to the PC for data communication through a general-purpose interface, such as the Small Computer System Interface (SCSI), typical of digital interfaces (hereinafter referred to as a digital I/F).

A digital camera and digital video camera are also peripherals for inputting data to a PC. Recently, more users use digital cameras and digital video cameras as the technology advances in the field of inputting to a PC, still image data or moving image data sensed by a digital camera or video camera along with audio data, then storing the data in hard disk of the PC or editing the data by the PC and outputting the data to be printed in color by a printer.

When image data is outputted from the PC to a printer or hard disk, data communication via SCSI is performed. In order to transmit a large amount of data such as image data, a digital I/F of general versatility, having a high data transfer rate is necessary.

FIG. 8 is a block diagram showing a conventional system in which a digital camera and a printer are connected to a PC.

Referring to FIG. 8, reference numeral 31 denotes a digital camera; 32, a personal computer (PC); and 33, a printer.

In the digital camera 31, reference numeral 34 denotes memory serving as a recording unit of the digital camera; 35, an image data decoder; 36, an image processor; 37, a D/A converter; 38, an electric view finder (EVF) serving as a display unit; and 39, a digital I/O unit of the digital camera.

In the PC 32, reference numeral 40 denotes a digital I/O unit for connecting the PC 32 to the digital camera 31; 41, an operation unit such as a keyboard, mouse or the like; 42, an image data decoder; 43, a display; 44, hard disk; 45, memory such as RAM or the like; 46, an MPU serving as a computation processor; 47, a PCI bus; 48, a SCSI interface (board) of the digital I/F.

In the printer 33, reference numeral 149 denotes a printer SCSI interface for connecting the printer 33 to the PC 32 through a SCSI cable; 150, memory; 151, a printer head; 152, a printer controller; and 153, a driver.

Next, description will be provided on the steps of inputting an image sensed by the digital camera 31 to the PC 32, and outputting the image data from the PC 32 to the printer 33.

When image data stored in the memory 34 of the digital camera 31 is read out, the read image data is, on one hand, decoded by the decoder 35, then subjected to image processing by the image processor 36 for displaying, and then processed by the D/A converter 37 to be displayed by the EVF 38. On the other hand, the read image data is outputted by the digital I/O unit 39 to the digital I/O unit 40 of the PC 32 through a cable.

In the PC 32, image data is inputted to the digital I/O unit 40 through the PCI bus 47 which serves as a two-way communication bus. When the image data is to be stored, the image data is stored in the hard disk 44, but when an image is to be displayed, the image data is decoded by the decoder 42, stored as display image data in the memory 45, and converted to analog signals in the display 43 to be displayed.

In the PC 32, an operation command such as an image edit command or the like is inputted by the operation unit 41. Processing for the entire PC 32 is executed by the MPU 46. For printing out an image, image data is transmitted from the SCSI interface board 48 of the PC 32 to the printer 33 through the SCSI cable. In the printer 33, the transmitted image data is received by the SCSI interface 149, and stored as print image data in the memory 150. Then, the printer controller 152 controls the printer head 151 and driver 153 according to the print image data read out of the memory 150 and an image is printed.

The foregoing are conventional steps of inputting image data to a PC and printing an image. As is apparent from the above description, conventionally, respective devices are connected to a PC serving as a host computer, and image data sensed by a digital camera is printed via the PC.

However, the aforementioned SCSI includes a type with a low data transfer rate, or one having a thick cable for parallel communication, or one with a limited type and method of connecting peripherals. Besides these, various other inconvenient aspects have been pointed out, e.g., the SCSI requires as many I/F connectors as the number of connected devices. Furthermore, many general home-use PCs or digital devices have connectors on the back of the PC for connecting the SCSI or other cables. Moreover, the large shape of the connector makes plugging in/out of the cable cumbersome.

Even in a case of connecting a mobile or portable device which normally is not used as a desk-top type device, e.g., digital camera or video camera or the like, the device must be connected to a connector usually on the back of the PC, which is quite cumbersome. Until recently, digital data communication has typically been represented by two-way communication between a PC and its peripherals. Therefore, aforementioned communication method did not cause any inconvenience. However, as the number of types of devices handling digital data increases and I/F improves, communication is performed not only between a PC and peripherals but also through a network which connects many digital devices, e.g., a digital video camera or digital recording medium driver apparatus or the like. This advancement has facilitated communication, and has enabled some devices to transmit an extremely large amount of data. However, using aforementioned communication method in such data transmission congests the network, and may influence other communication between devices in the network.

In view of this, means has been proposed to solve these problems related to the conventional digital I/F, and realize data communication not only between a PC and its peripherals but also among any digital devices through a general-purpose digital I/F uniformly incorporated in each device (e.g., High-Performance Serial Bus in compliance with IEEE 1394-1995). In such configuration, data communication is possible among devices such as a PC, printer, other peripherals, digital camera, digital video tape recorder (VTR) integrating a camera, or the like, through a network.

Main features of the IEEE 1394-compliant serial bus include: a relatively thin cable because of adoption of high-speed serial communication as will be described later;

high flexibility; an extremely small connector compared to the SCSI cable; and high-speed transfer capability of transferring a large amount of data such as image data together with device control data.

In other words, performing communication using the IEEE 1394-compliant I/F provides an advantage in that, even in a case of connecting a mobile, portable, non-desktop-type device such as a digital camera or video camera or the like to a PC through a network, the aforementioned cumbersome operation is considerably reduced, and image data can be smoothly transferred to the PC.

As described above, the IEEE 1394-compliant I/F provides various convenient aspects for eliminating cumbersome operation of the conventional data communication system. Particularly, because of the advantage of high-speed transfer capability of transferring a large amount of data, e.g., image data, together with device control data, a new system can be constructed for enabling a PC to control an image sensing apparatus such as a video camera through a network.

In a system having such a construction, it has become an object to achieve stable operation of an electronic device such as a video camera, even when errors occur during data communication.

SUMMARY OF THE INVENTION

The present invention is made in consideration of the above situation, and has as its object to enable stable operation of an electronic device even if communication errors occur.

According to the present invention, the foregoing object is attained by providing an electronic device comprising: communication means for communicating with an external control apparatus; a control target to be controlled by the external control apparatus based on control data; first memory for temporarily storing the control data from the external control apparatus; second memory for storing the control data stored in the first memory; third memory for storing predetermined standard data of control data; error detection means for detecting a communication error occurred in communication with the external control apparatus; and control means for deleting the control data stored in the first memory when the communication error is detected, and controlling the control target based on the control data stored in the second memory or the predetermined standard data stored in the third memory.

According to the present invention, the foregoing object is also attained by providing an electronic device comprising: communication means for communicating with an external control apparatus; a control target to be controlled by the external control apparatus based on control data; first memory for temporarily storing the control data from the external control apparatus; second memory for storing the control data stored in the first memory; third memory for storing predetermined standard data of control data; a counter for counting a number of items of the control data transmitted by the external control apparatus; comparison means for comparing a counter value with a threshold value; error detection means for detecting a communication error occurred in communication with the external control apparatus; and control means for deleting the control data stored in the first memory in accordance with a comparison result of the comparison means at the time of detection, or transferring the control data stored in the first memory to the second memory when the communication error is detected, and controlling the control target based on the control data stored in the second memory or the predetermined standard data stored in the third memory.

Further, the foregoing object is also attained by providing an electronic device comprising: communication means for communicating with an external control apparatus; a control target to be controlled by the external control apparatus based on control data; first memory for temporarily storing the control data from the external control apparatus; second memory for storing the control data stored in the first memory; third memory for storing predetermined standard data of control data; determination means for determining reliability of the control data stored in the first memory; error detection means for detecting a communication error; and control means for deleting the control data stored in the first memory in accordance with a determination result of the determination means, or transferring the control data stored in the first memory to the second memory when the communication error is detected, and controlling the control target based on the control data stored in the second memory or the predetermined standard data stored in the third memory.

Further, the foregoing object is also attained by providing a control method of an electronic device having first memory which stores predetermined standard data of control data for a control target, the method comprising: a communication step of communicating with an external control apparatus; a first storage step of temporarily storing control data from the external control apparatus in second memory; an error determination step of determining whether or not an error has occurred in communication with the external control apparatus; a second storage step of storing the control data, stored in the second memory, in third memory, when determination is made in the error determination step that no communication error has occurred; and a control step of deleting the control data stored in the second memory when determination is made in the error determination step that a communication error has occurred, and controlling the control target based on the control data stored in the third memory or the predetermined standard data stored in the first memory.

Further, the foregoing object is also attained by providing a control method of an electronic device having first memory which stores predetermined standard data of control data for a control target, the method comprising: a communication step of communicating with an external control apparatus; a first storage step of temporarily storing control data from the external control apparatus in second memory; a counting step of counting a number of items of the control data transmitted by the external control apparatus; a comparison step of comparing a counter value with a threshold value; an error determination step of determining whether or not an error has occurred in communication with the external control apparatus; a second storage step of storing the control data, stored in the second memory, in third memory, when determination is made in the error determination step that no communication error has occurred; and a control step of deleting the control data stored in the second memory or transferring the control data stored in the second memory to the third memory in accordance with a comparison result of the comparison step when determination is made in the error determination step that a communication error has occurred, and controlling the control target based on the control data stored in the third memory or the predetermined standard data stored in the first memory.

Further, the foregoing object is also attained by providing a control method of an electronic device having first memory which stores predetermined standard data of control data for a control target, the method comprising: a communication step of communicating with an external control apparatus; a first storage step of temporarily storing control data from the external control apparatus in second memory; a reliability determination step of determining reliability of the control data stored in the second memory; an error determination step of determining whether or not an error has occurred in communication with the external control apparatus; a second storage step of storing the control data, stored in the second memory, in third memory, when determination is made in the error determination step that no communication error has occurred; and a control step of deleting the control data stored in the second memory or transferring the control data stored in the second memory to the third memory in accordance with a determination result of the reliability determination step when determination is made in the error determination step that a communication error has occurred, and controlling the control target based on the control data stored in the third memory or the predetermined standard data stored in the first memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are tables showing types of camera control commands;

FIG. 16 is a diagram useful in describing asynchronous transfer;

FIG. 17 is a diagram showing an example of packet format in asynchronous transfer;

DETAILED DESCRIPTION OF THE PREFERRED EMBODIMENTS

Preferred embodiments of the present invention will be described in detail in accordance with the accompanying drawings.

Figure 2:
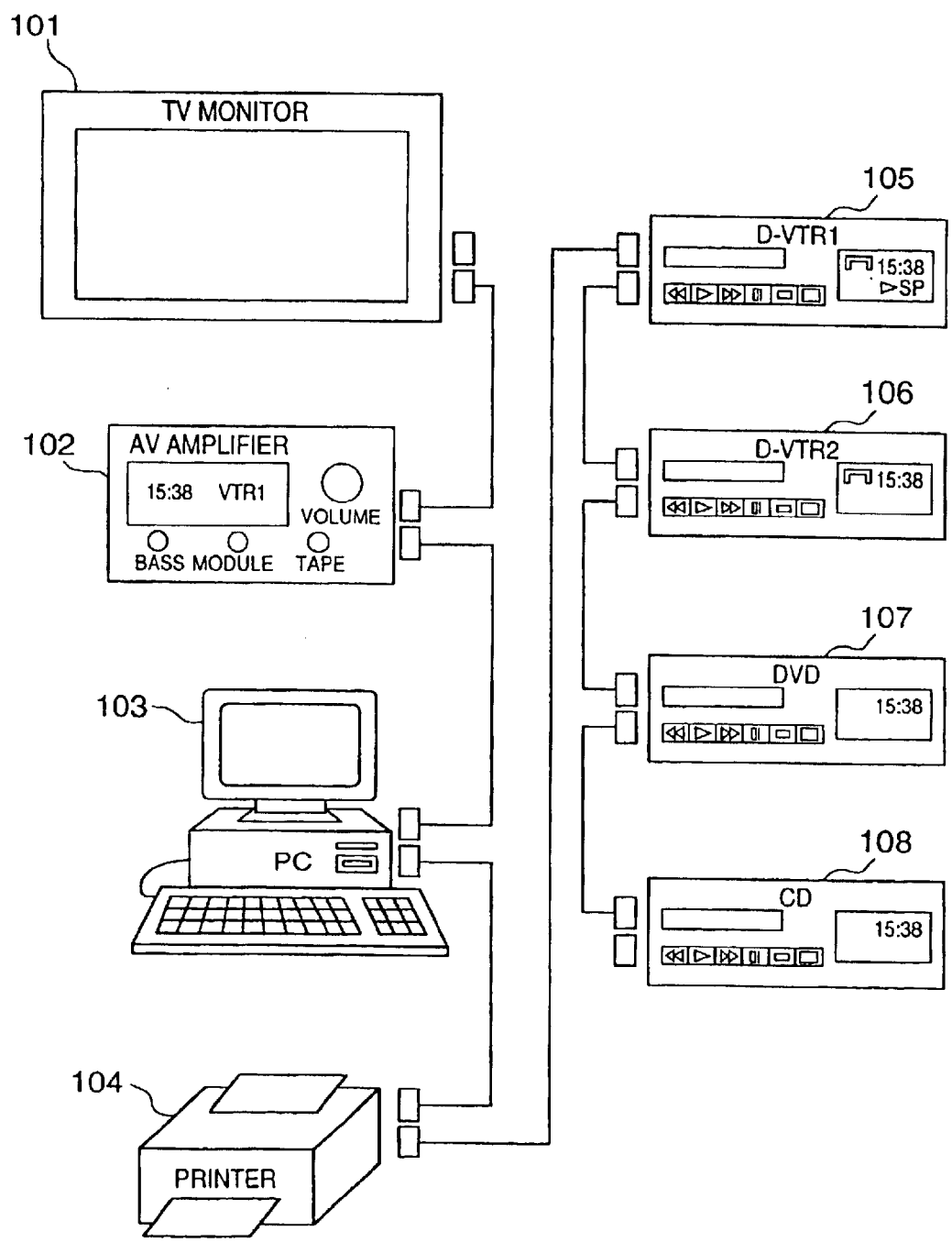
FIG. 2 shows a network construction employing an IEEE 1394-compliant serial bus.

FIG. 2 shows a network construction according to embodiments of the present invention.

Since embodiments of the present invention employ an IEEE 1394-compliant serial bus as a digital I/F for connecting respective devices shown in FIG. 2, the IEEE 1394-compliant serial bus is now described.

Overview of IEEE-1394 Technology

The appearance of digital VTRs and DVDs for home use has been accompanied by the need for support when transferring video and audio data in real time and in great quantity in terms of the information contained. An interface capable of high-speed data transfer is required to transfer audio and video data in real time and load the data in a personal computer or transfer it to another digital device. An interface that has been developed in view of the foregoing is the High-Performance Serial Bus in compliance with IEEE 1394-1995. This bus will be referred to as a "1394 serial bus" below.

Figure 9:
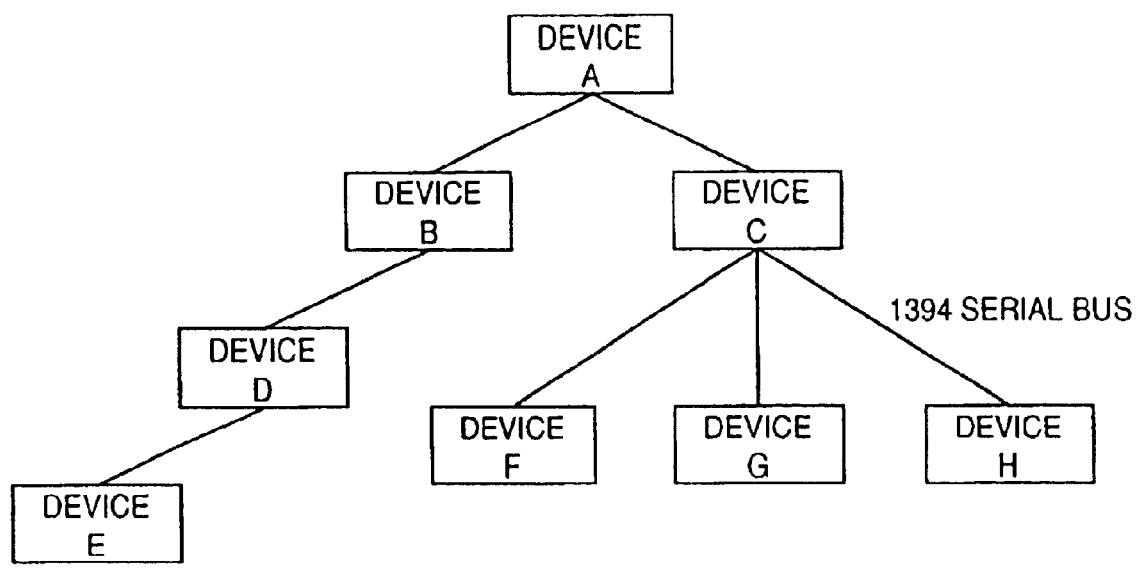
FIG. 9 is a diagram showing a networking system constructed using the 1394-compliant serial bus.

FIG. 9 illustrates an example of a networking system constructed using the 1394 serial bus. This system has devices A, B, C, D, E, F, G and H. Twisted-pair cables of the 1394 serial bus connect devices A and B; A and C; B and D; D and E; C and F; C and G; and C and H. Examples of the devices A to H are a personal computer, digital VTR, DVD, digital camera, hard disk and monitor.

The scheme for connecting these devices can be a mixture of a daisy chaining and node branching. A high degree of freedom in making the connections is possible.

Each device has its own ID and by, recognizing one another based upon their IDs, the devices construct one network over an area connected by the 1394 serial bus. By simply interconnecting adjacent devices in succession by one 1394 serial-bus cable connected between adjacent devices, each device functions as a relay and the devices in their entirety construct one network.

When the cable is connected to a device through a plug-and-play function, which is one feature of a 1394 serial bus, device recognition and recognition of the status of a connection is performed automatically.

In the system shown in FIG. 9, devices can be deleted from or added to the network. At such time bus reset is performed automatically, the network configuration that prevailed thus far is reset and then a new network is constructed afresh. This function makes it possible to set up a network at any time and for the network to identify the devices constructing it.

Further, 100, 200 and 400 Mbps are available as the data transfer speeds. Devices having higher transfer speeds support lower transfer speeds and are compatible with the devices of lower speed.

The data transfer modes available are an asynchronous transfer mode for transferring asynchronous data such as control signals, and an isochronous transfer mode for transferring isochronous data such as real-time video and audio data. In each cycle (usually 125 µs), the asynchronous data and isochronous data are mixed and transferred in one cycle, while priority is given to transfer of the isochronous data, following transfer of a cycle-start packet (CSP) that indicates the start of the cycle.

Figure 10:
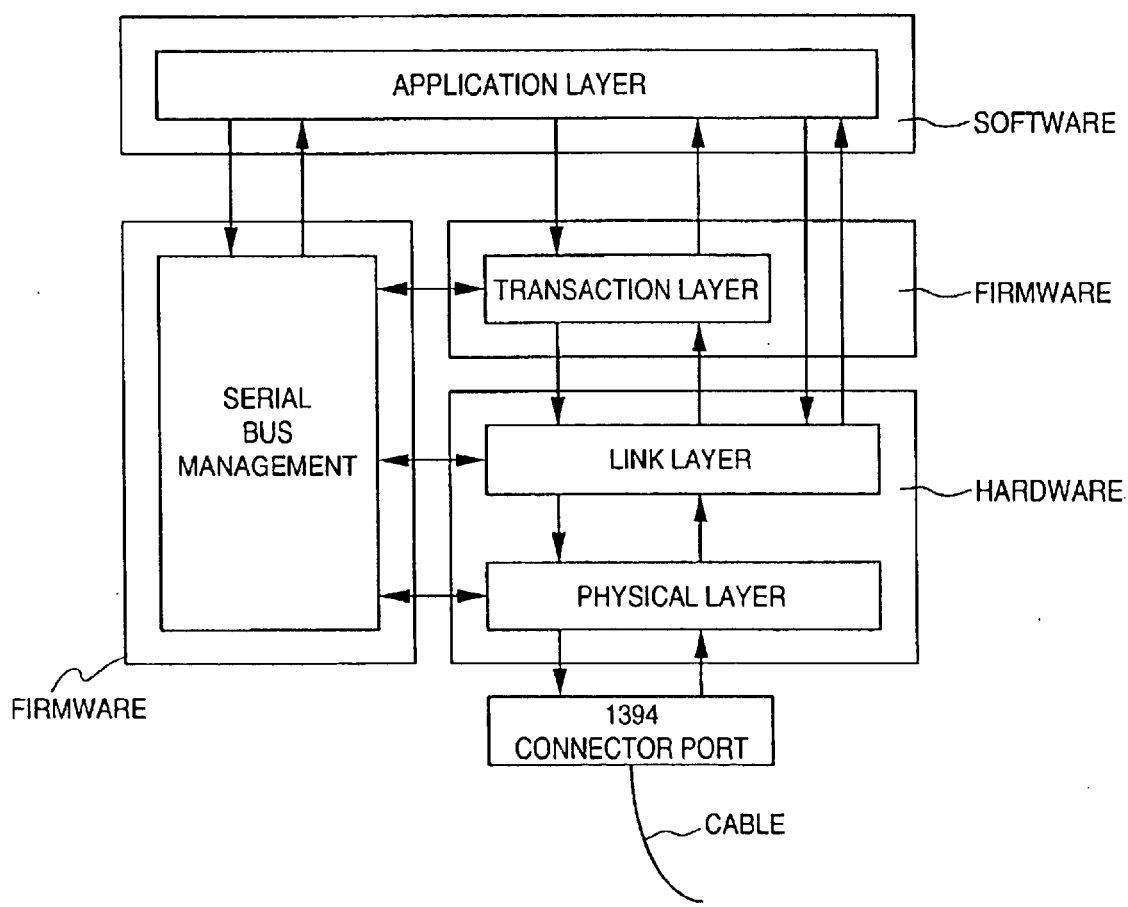
FIG. 10 is a diagram showing the structural components of the 1394-compliant serial bus.

FIG. 10 illustrates the structural components of the 1394 serial bus.

The 1394 serial bus has a layered (hierarchical) structure overall. As shown in FIG. 10, the most basic hardware component is the cable of the 1394 serial bus. The cable has a connector port to which the cable is connected. A physical layer and a link layer are the higher layers of the hardware.

In practical terms, the hardware is constituted by interface chips, of which the physical layer performs encoding and connector-related control, etc., and the link layer performs packet transfer and cycle-time control, etc.

The firmware includes a transaction layer for managing data to be transferred (transacted) and for issuing instructions such as read and write instructions. Serial-bus management is for managing the status of connections and the ID of each connected device as well as the configuration of the network.

The hardware and firmware make up the essential structure of the 1394 serial bus.

The software constitutes an application layer that differs depending upon the software used. The application layer decides how data is placed on the interface. For example, this is stipulated by a protocol such as an audio-video protocol.

The foregoing sets forth the structure of the 1394 serial bus.

Figure 11:
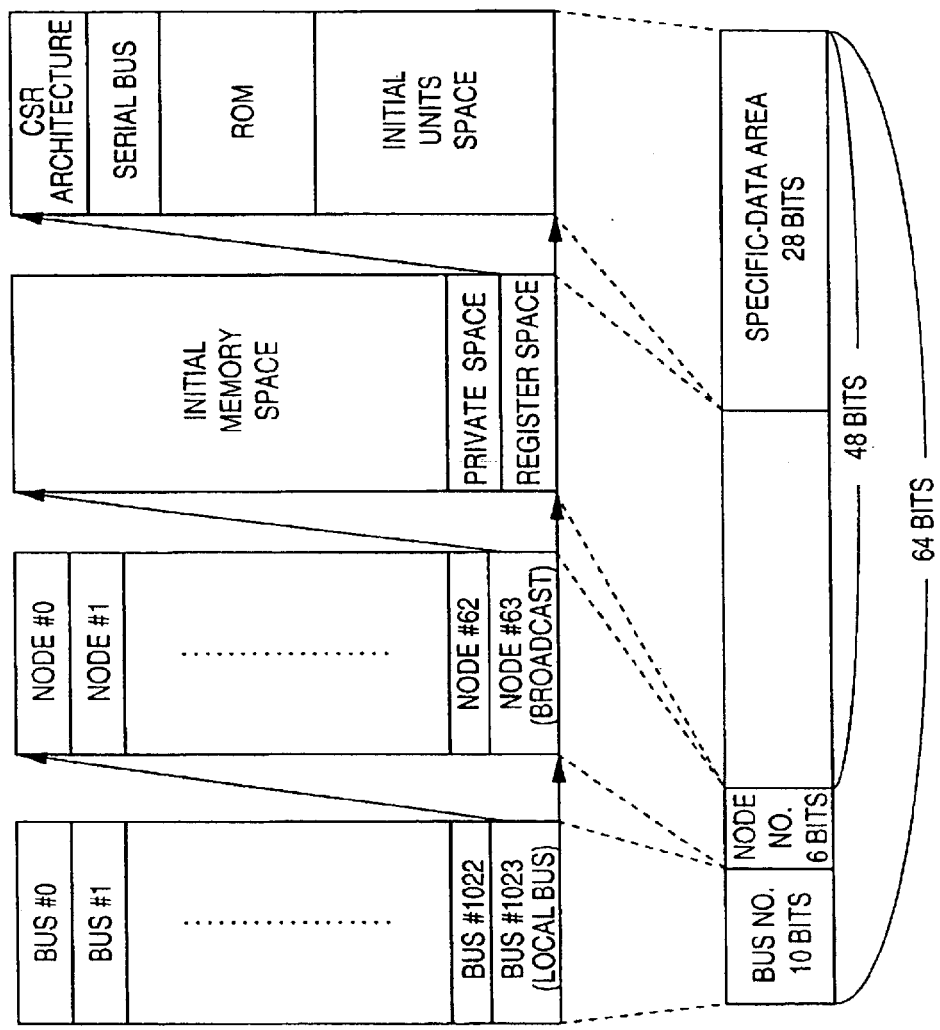
FIG. 11 is a diagram showing the address space of the 1394-compliant serial bus.

FIG. 11 illustrates the address space of the 1394 serial bus.

Each device (node) connected to the 1394 serial bus always possesses a 64-bit address that is specific to the node. Storing these addresses in a ROM makes it possible for a node's own address and for the node addresses of other nodes to be recognized at all times. This also makes it possible to perform communication in which the other party is specified.

Addressing a 1394 serial bus is performed in compliance with the standard of IEEE 1212. An address is set using the first 10 bits to specify a bus number and the next six bits to specify a node ID number. The remaining 48 bits constitute address width given to a device and can be used as the specific address space. The last 28 bits of these 48 bits serve as an area for specific data and store information for identifying each device and for designating conditions of use.

The foregoing is an overview the 1394 serial bus technology.

The features of the 1394 serial bus will now be described in greater detail.

Electrical Specifications of the 1394 Serial Bus

Figure 12:
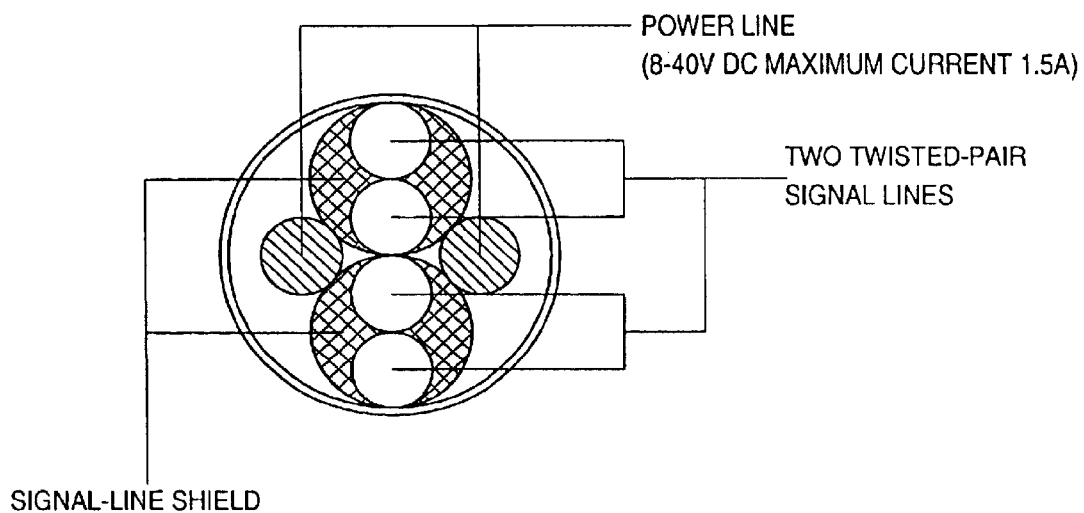
FIG. 12 is a sectional view of the cable of the 1394-compliant serial bus.

FIG. 12 is a sectional view illustrating the 1394 serial bus cable.

The connection cable of the 1394 serial bus may be internally provided with a power-supply line in addition to two twisted-pair signal conductors. This makes it possible to supply power to a device not having a power supply and to a device whose voltage has dropped due to failure. Note, there is a simplified connection cable which does not include a power-supply line. However, such a cable is used to connect to specific devices. According to specifications, the voltage of the power that flows through the power-supply line is 8 to 40 V and the current is a maximum of 1.5 A DC.

DS-Link Coding

Figure 13:
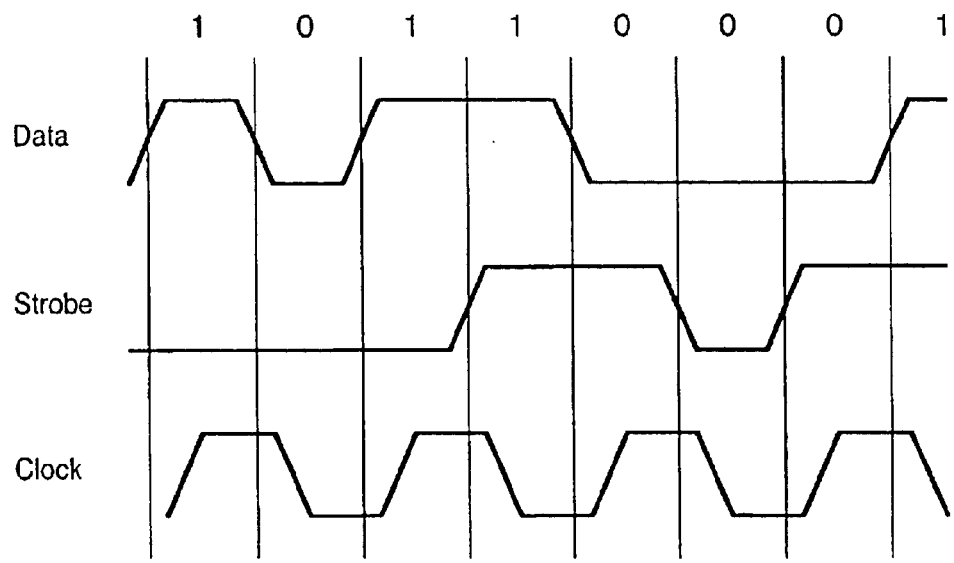
FIG. 13 is a diagram useful in describing the DS-link coding scheme of a data transfer format.

FIG. 13 is a diagram useful in describing the DS-link coding scheme of a data transfer format employed in the 1394 serial bus.

The 1394 serial bus employs DS-link (Data/Strobe link) coding. DS-link coding is suited to high-speed serial-data communication. This requires two twisted-pair signal lines. One twisted-pair mainly sends data and the other sends a strobe signal. On the receiving side, a clock can be reproduced by taking the exclusive-OR between the transmitted data and strobe.

Using the DS-link coding scheme is advantageous in that transmission efficiency is higher in comparison with other serial-data transmission schemes and in that the scale of the controller LSI circuitry can be reduced because a PLL circuit is unnecessary. Furthermore, when there is no data to be transferred, there is no need to send information indicative of the idle state. Accordingly, by placing the transceiver circuit of each device in the sleep state, less power is consumed.

Bus-reset Sequence

In the 1394 serial bus, a node ID is assigned to each connected device (node) so that the devices may be recognized as constituting a network.

If there is a change in the network configuration, e.g., a change caused by increasing or decreasing the number of nodes by plugging in or unplugging a node or by turning a node power supply on or off, recognition of the new network configuration becomes necessary. At such time each node that has sensed the change transmits a bus-reset signal over the bus and a mode in which the new network configuration recognized is established. The method of sensing the change involves sensing a change in bias voltage on the board of the 1394 port.

Upon being sent a bus-reset signal from a certain node, the physical layer of each node receives the bus-reset signal and, at the same time, reports occurrence of the bus reset to the link layer and sends the bus-reset signal to the other nodes. After all nodes have eventually sensed the bus-reset signal, bus reset is activated.

Bus reset can also be activated by hardware detection of cable plugging/unplugging and of network anomalies and by issuing an instruction directly to the physical layer by host control from the protocol. When bus reset is activated, data transfer is suspended temporarily and is resumed on the basis of the new network configuration after the completion of reset.

The foregoing is a description of the bus-reset sequence.

Node-ID Decision Sequence

In order for each of the nodes to construct the new network configuration after bus reset, an operation for assigning an ID to each node begins. The usual sequence from bus reset to determination of node IDs will be described with reference to the flowcharts of FIGS. 21, 22 and 23.

Figure 21:
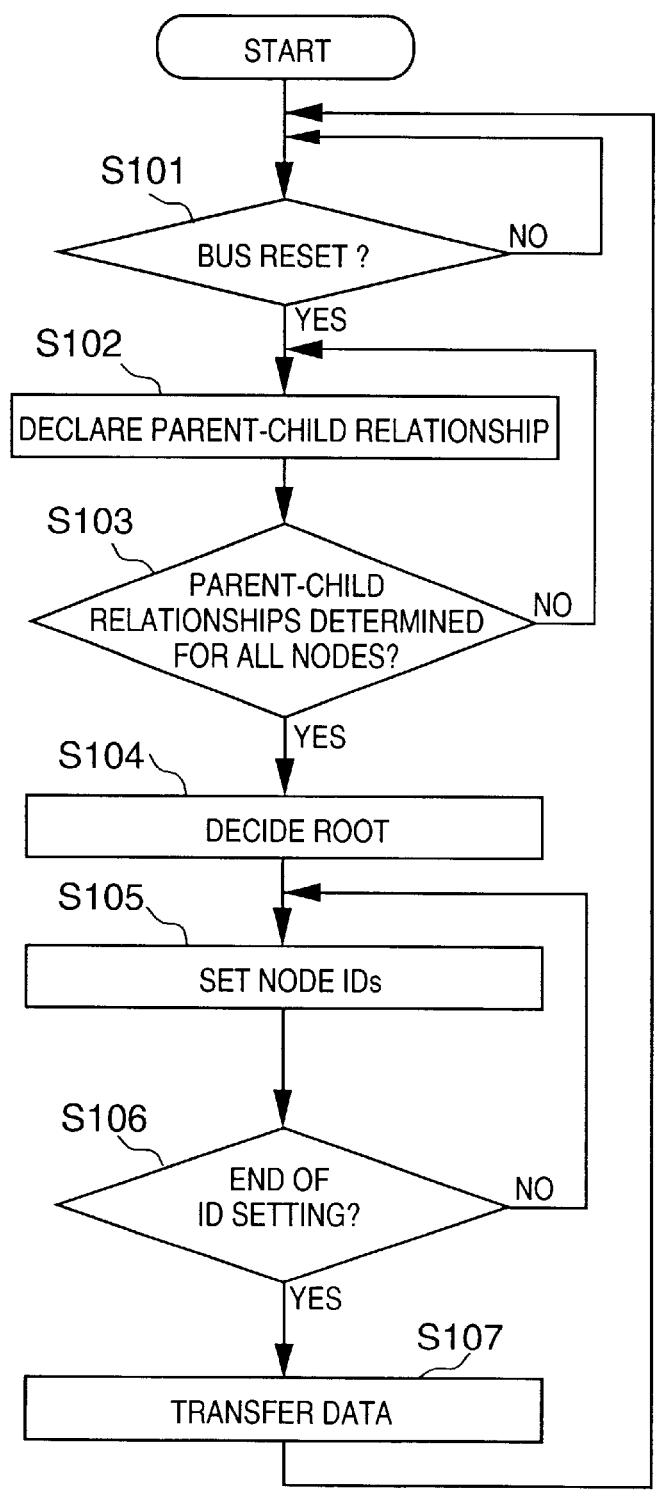
FIG. 21 is a flowchart illustrating a general sequence from bus reset to determination of a node ID.

The flowchart of FIG. 21 illustrates a series of bus operations from occurrence of bus reset to determination of node IDs and data transfer.

First, occurrence of bus reset within the network is monitored constantly at step S101. Control proceeds to step S102 when bus reset occurs as a result of a node power supply being turned on or off, etc.

In step S102, a declaration of parent-child relationship is made between directly connected nodes in order to ascertain the status of the connections of the new network from reset state of the network. If the parent-child relationships have been determined between all nodes at step S103, one root is decided at step S104. Until the parent-child relationships are determined between all-nodes, the declaration of the parent-child relationship at step S102 is repeated and a root is not decided.

When a root is decided at step S104, a node-ID setting operation for providing each node with an ID is carried out at step S105. Node IDs are set in a predetermined node sequence and the setting operation is performed repeatedly until all nodes have been provided with IDs. When the setting of IDs for all nodes is eventually completed at step S106, the new network configuration will have been recognized at all nodes and a state will be attained in which data transfer between nodes can be carried out at step S107. Data transfer thus begins.

When the state of step S107 is attained, a transition is again made to the mode in which the occurrence of bus reset is monitored. If bus reset occurs, the setting operation from step S101 to step S106 is repeated.

Figure 22:
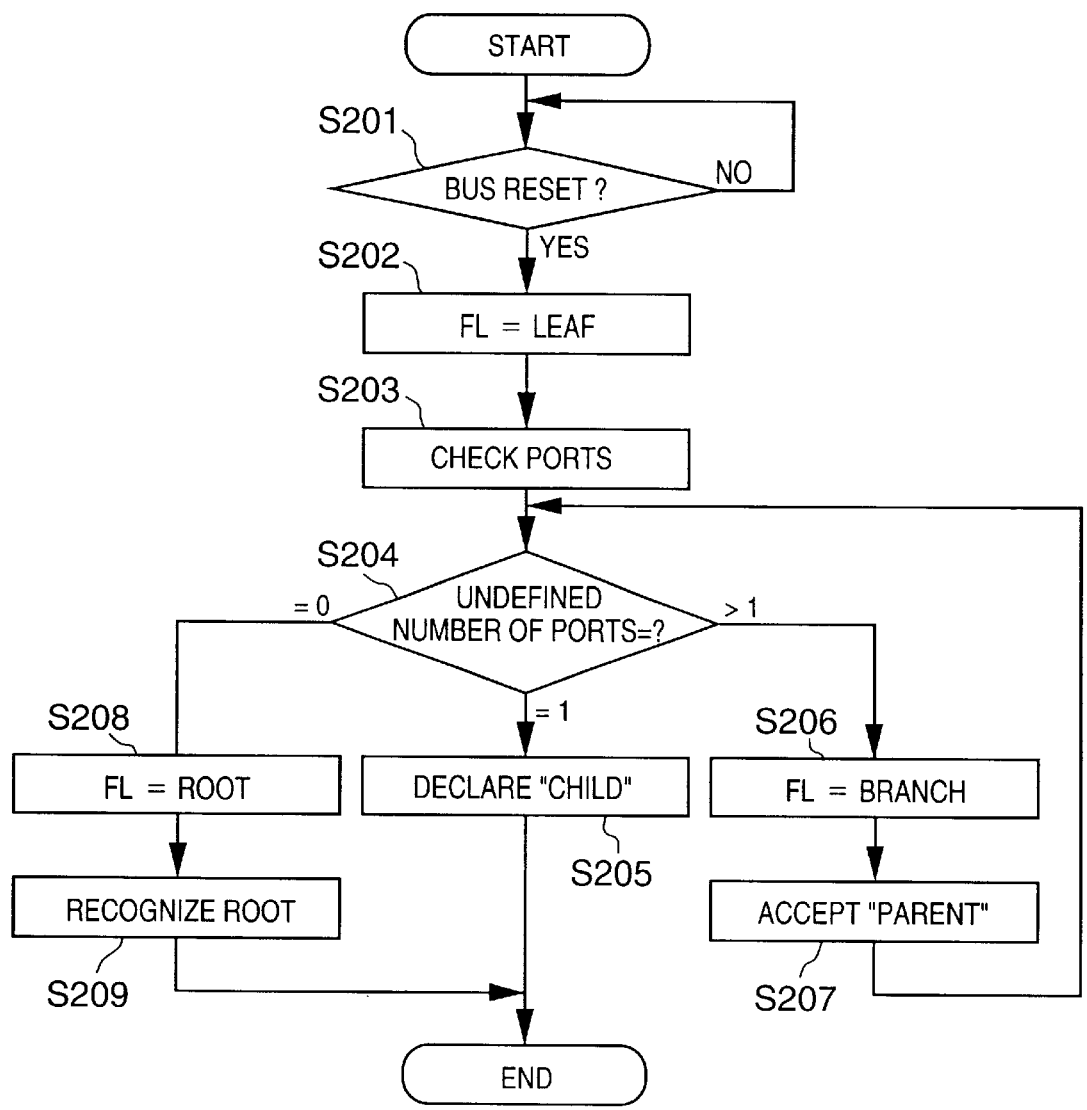
FIG. 22 is a flowchart illustrating a general sequence from bus reset to determination of a node ID.
Figure 23:
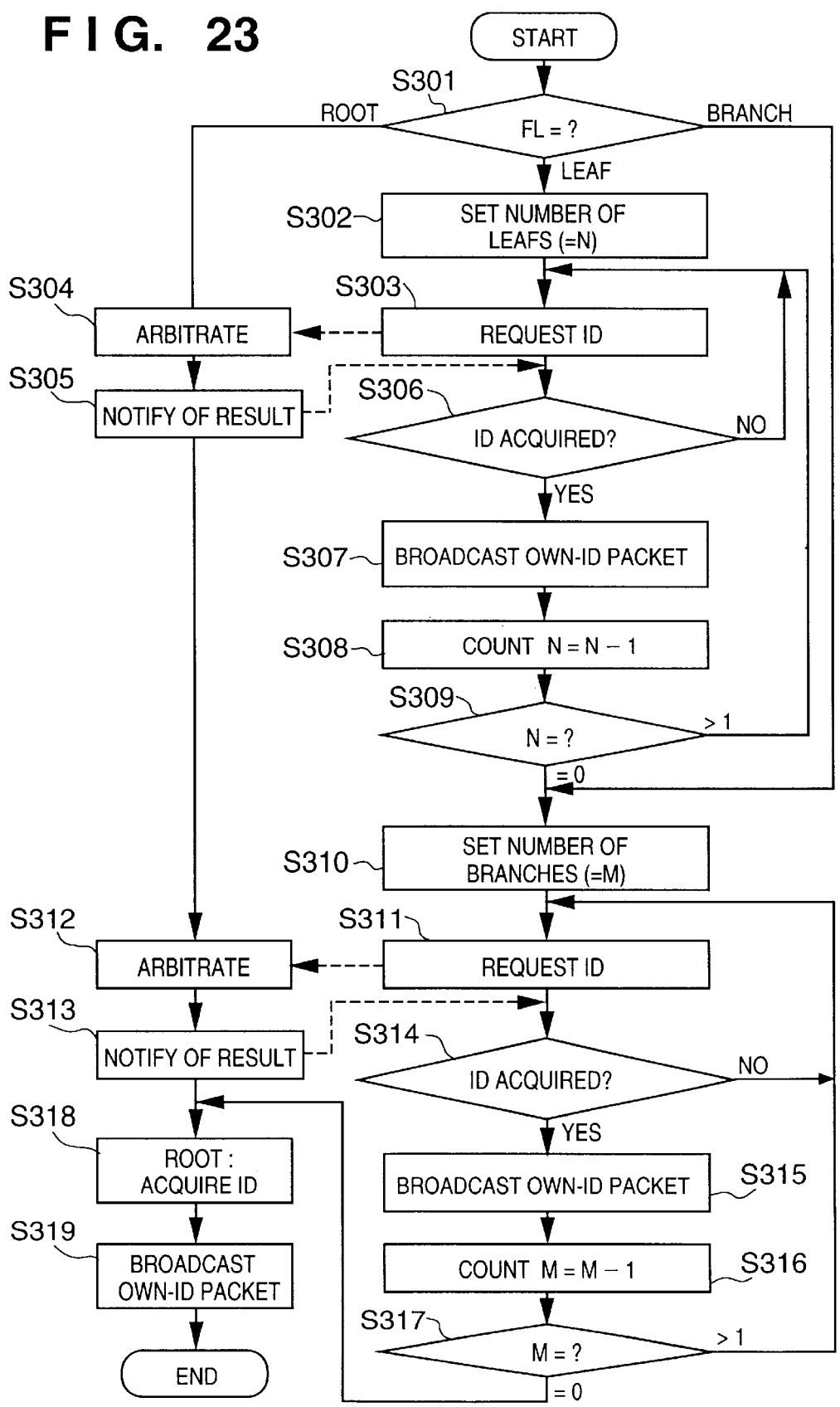
FIG. 23 is a flowchart illustrating a general sequence from bus reset to determination of a node ID.

The foregoing is a description of the flowchart of FIG. 21. The portion of this flowchart from bus reset to root determination and the procedure from the conclusion of root determination to the end of ID setting are illustrated in FIGS. 22 and 23, respectively, when expressed more precisely in flowchart form.

The flowchart of FIG. 22 will now be described.

When a bus reset occurs at step S201, the network configuration is reset temporarily. It should be noted that occurrence of bus reset is constantly monitored at step S201. Next, at step S202, a flag indicative of a leaf node is set for each device as the first step of an operation for re-recognition of the topology of the reset network. Furthermore, at step S203, each device determines how many of its own ports have been connected to other devices.

This is followed by step S204, at which the number of undefined ports (ports for which the parent-child relationship has not been determined) is checked, based upon the number of ports obtained at step S203, in order to begin the ensuing declaration of parent-child relationship. After bus reset, the number of ports will be equal to the number of undefined ports. However, as parent-child relationships are decided, the number of undefined ports sensed at step S204 changes.

Immediately after bus reset, nodes which can make declarations of parent-child relationship first are limited to leafs. A node can ascertain that it is a leaf from examining the number of connected ports at step S203. The leaf declares with respect to a node connected to it that "This node is the child and the other node is the parent" at step S205. This operation then ends.

With regard to a node whose number of connected ports is found to be plural at step S203, meaning that the node has been identified as a branch point, the number of undefined ports after bus reset is found to be greater than 1 at step S204. As a result, control proceeds to step S206. First a flag indicative of a branch is set at step S206. This is followed by step S207, at which the node waits for acceptance of "Parent" in the declaration of the parent-child relationship from a leaf. The leaf makes the declaration of the parent-child relationship and the branch that received this at step S207 checks the number of undefined ports at step S204. If the number of undefined ports is 1, it is possible to declare "The node is a child" at step S205 to the node connected to the remaining port. If, from the second time onward, there are two or more branches when the number of undefined ports is checked at step S204, the node again waits in order to accept "Parent" from a leaf or from another branch at step S207.

Finally, when any one branch or, in exceptional cases, a leaf (because the node did not operate quickly enough to issue the "Child" declaration) indicates zero as the number of undefined ports at step S204, the declarations of the parent-child relationship for the entire network end as a result. The sole node for which the number of undefined ports has become zero (i.e., for which all of the ports have been determined to be parent ports) has a root flag set for it at step S208, and this node is recognized as a root at step S209.

Thus ends the processing of FIG. 22 from bus reset to declaration of the parent-child relationships between all nodes of the network.

The flowchart of FIG. 23 will now be described.

In the sequence up to FIG. 22, information on the flags of all nodes that indicates whether a node is a leaf, a branch or a root is set. The nodes are classified on the basis of this information at step S301.

In the operation of assigning an ID to each node, the node for which an ID can be set first is a leaf. The setting of IDs is performed in order of leaf, branch, and root starting from smaller numbers (from a node number 0).

The number N (where N is a natural number) of leafs that exist in the network is set at step S302. Each leaf then requests the root to be given an ID at step S303. In a case where there are a plurality of requests, the root performs arbitration (an operation to decide on any one node) at step S304. An ID number is assigned to the one winning node and the losing nodes are so notified at step S305.

A leaf whose acquisition of an ID ended in failure at step S306 issues an ID request again. The foregoing operation is then repeated. A leaf that has acquired an ID transfers the ID information of this node to all nodes by a broadcast at step S307.

When the broadcast of the ID information of one node ends, the number of remaining leafs is reduced by one at step S308. If the number of remaining leafs is found to be one or more at step S309, operation is repeated from the ID request at step S303. When all leafs have finally broadcast ID information, N becomes equal to 0 at step S309 and control then proceeds to the setting of branch IDs.

The setting of branch IDs is performed in a manner similar to that for leafs. That is, the number M (where M is a natural number) of branches that exist in the network is set at step S310. Each branch then requests the root to be given an ID at step S311. In response, the root performs arbitration at step S312 and assigns the winning branch a number in order starting from smaller numbers that follow those already assigned to leafs. The root notifies a branch that has issued a request of its ID number or of the fact that the request failed at step S313. A branch whose acquisition of an ID ended in failure at step S314 issues an ID request again. The foregoing operation is then repeated.

A branch that has acquired an ID transfers the ID information of this node to all nodes by a broadcast at step S315.

When the broadcast of the ID information of one node ends, the number of remaining branches is reduced by one at step S316. If the number of remaining branches is found to be one or more at step S317, operation is repeated from the ID request at step S311. This operation is carried out until all branches eventually broadcast ID information. When all branches acquire node IDs, M becomes equal to 0 at step S317 and the mode for acquiring branch IDs ends.

When processing thus far ends, a node which has not yet acquired ID information is a root only. The root sets the largest unassigned number as its own ID number at step S318 and broadcasts the root ID information at step S319.

Thus, as shown in FIG. 9, the procedure up to the setting of IDs for all nodes following the parent-child relationship determinations ends.

Next, operation in an actual network shown in FIG. 14 will be described as one example.

Figure 14:
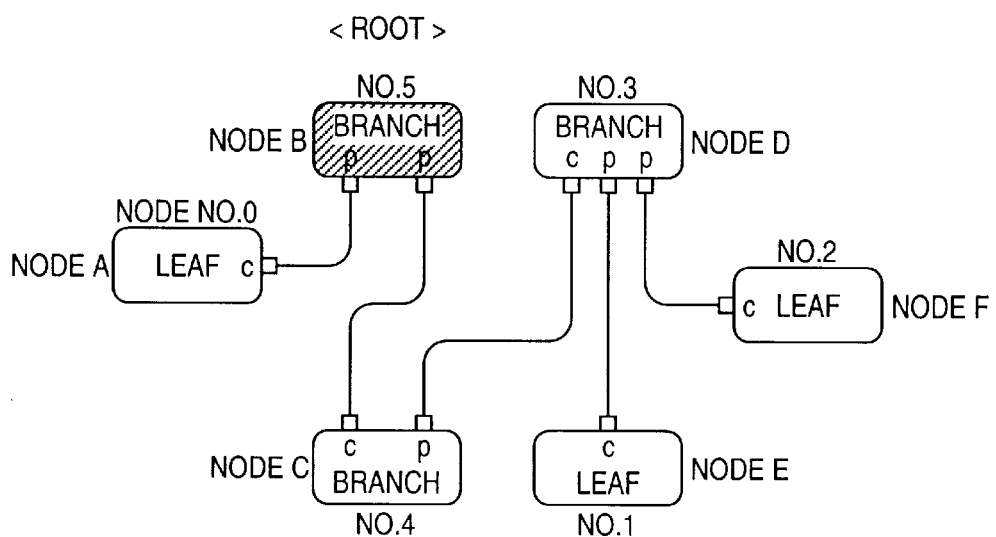
FIG. 14 is a diagram useful in describing a node-ID determination sequence.

The hierarchical structure described in FIG. 14 is such that nodes A and C are directly connected as inferior to node B (the root), node D is directly connected as inferior to node C, and nodes E and F are directly connected as inferior to node D. This hierarchical structure and a procedure for determining the route node and node IDs will be described below.

In order to recognize the connection status of each node after bus reset, a declaration of the parent-child relationship is made between the ports at which the nodes are directly connected. A parent has a superior status in the hierarchical structure and the child has an inferior status. In FIG. 14, the node that issues the declaration on parent-child relationship first following bus reset is the node A. Basically, declaration of the parent-child relationship can be issued from a node (referred to as a leaf) having a connection at only one port. The node can ascertain this from the fact that is has only one port connected. In this way the node recognizes that it is at a terminus of the network and the parent-child relationships are determined one after another starting from those terminus nodes that go into operation earliest.

Thus, the port on the side (node A of the nodes A and B) that has issued the declaration of the parent-child relationship is set as a child port, and the port on the side of the other party (node B) is set as a parent port. Accordingly, it is determined that nodes A and B are child-parent related, nodes E and D are child-parent related, and nodes F and D are child-parent related, respectively.

Nodes one layer higher have a plurality of connected ports. These nodes are referred to as branches. Among these nodes, those that have received declarations of the parent-child relationship from other nodes issue declarations of the parent-child relationship in succession and to their superiors. In FIG. 14, after node D is determined to be the parent in the D–E and D–F relationships, it issues the declaration of the parent-child relationship with respect to node C. As a result, the relationship determined between nodes D and C is child—parent, respectively.

Node C, which has received the declaration of parent-child relationship from node D, issues a declaration of parent-child relationship with regard to node B, which is connected to the other port of node C. As a result, it is determined that the relationship between nodes C and B is child—parent, respectively.

Thus, the hierarchical structure of FIG. 14 is constructed and node B, which is the parent to all connected nodes, is eventually determined to be the root node. Only one root node can exist in one network configuration.

Node B in FIG. 14 has been determined to be the root node. If node B, which has received the declaration of parent-child relationship from node A, issues its declaration of parent-child relationship to other nodes at an early timing, there is the possibility that the root node will shift to another node. In other words, depending upon the timing at which the declaration is transmitted, any node can become the root node, and in one and the same network configuration, the root node is not always fixed.

After the root node is decided, a transition is made to a mode for deciding the node IDs. In this mode all nodes communicate their own node IDs to all other nodes. This is a broadcast function.

A node's own ID information includes its own node number, information on the position at which it has been connected, the number of ports it possesses, the number of ports connected or information on the parent-child relationship of each port.

The procedure for assigning node ID numbers can be started from nodes (leafs) having only one of their ports connected. Node numbers 0, 1, 2, . . . are assigned to these nodes in regular order.

A node that has acquired a node ID broadcasts information inclusive of the node number to each of the other nodes. As a result, this ID number is recognized as being "already assigned".

If all leafs have finished acquiring their own node IDs, then operation shifts to branches so that node ID numbers are assigned to branch nodes after leaf nodes. In a manner similar to that of the leafs, branches to which node ID numbers have been assigned broadcast their node ID information in succession. Finally, the root node broadcasts its own ID information. That is, the root always possesses the largest node ID number.

Thus, the assignment of the node IDs of the entire hierarchical structure ends, the network is reconstructed and the bus initialization operation is completed.

Arbitration

With a 1394 serial bus, arbitration for bus access is always carried out before data transfer. The 1394 serial bus is a logical bus-type network. In other words, each separately connected device relays a transferred signal, thereby transmitting the same signal to all devices in the network. Consequently, arbitration is necessary to prevent collision of packets. As a result, only one node can perform a transfer at a certain time.

Figure 15A:
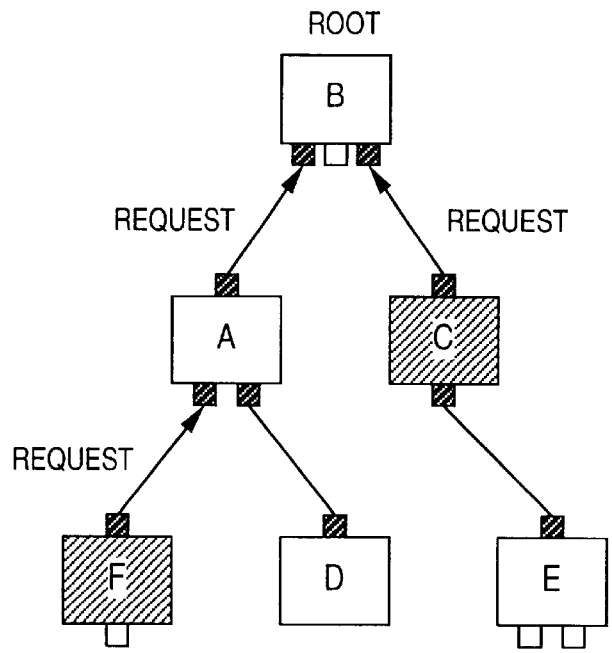
FIGS. 15A and 15B are diagrams useful in describing arbitration.
Figure 15B:
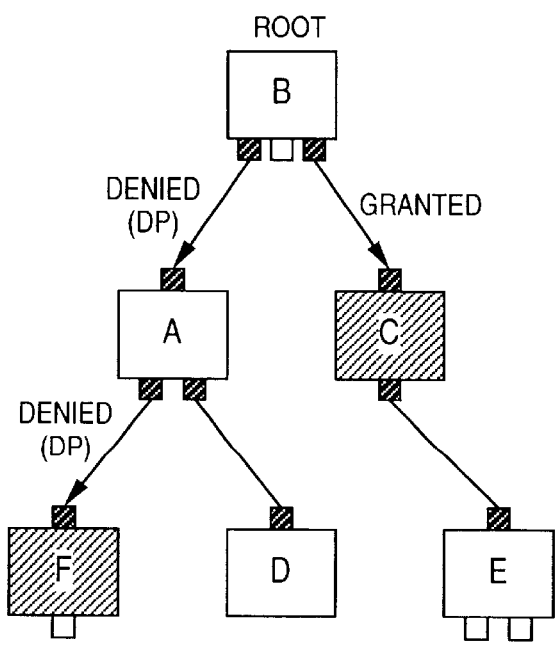

FIGS. 15A and 15B are diagrams useful in describing arbitration, in which FIG. 15A illustrates the situation when bus access bus is requested and FIG. 15B shows a situation in which bus access is allowed or refused in response to a request. Arbitration will now be described with reference to these diagrams.

When arbitration starts, one or a plurality of nodes each sends the parent node a request for bus access privilege. In FIG. 15A, nodes C and F are the nodes issuing bus access requests. A parent node (node A in FIG. 15) that has received a bus access request sends (relays) the request to its parent node. This request eventually arrives at the root that performs arbitration.

Upon receiving the bus access request, the root node decides which node should be granted access to the bus. Such arbitration is performed solely by the root node. The node that has won the arbitration is granted access to the bus. FIG. 15B shows that bus access has been granted to node C and denied to node F.

A DP (Data Prefix) is sent to the node that lost the arbitration, thereby informing this node of refusal. The bus access request from the refused node waits for the next arbitration.

The node that won the arbitration and was granted bus access can start transferring data.

Figure 24:
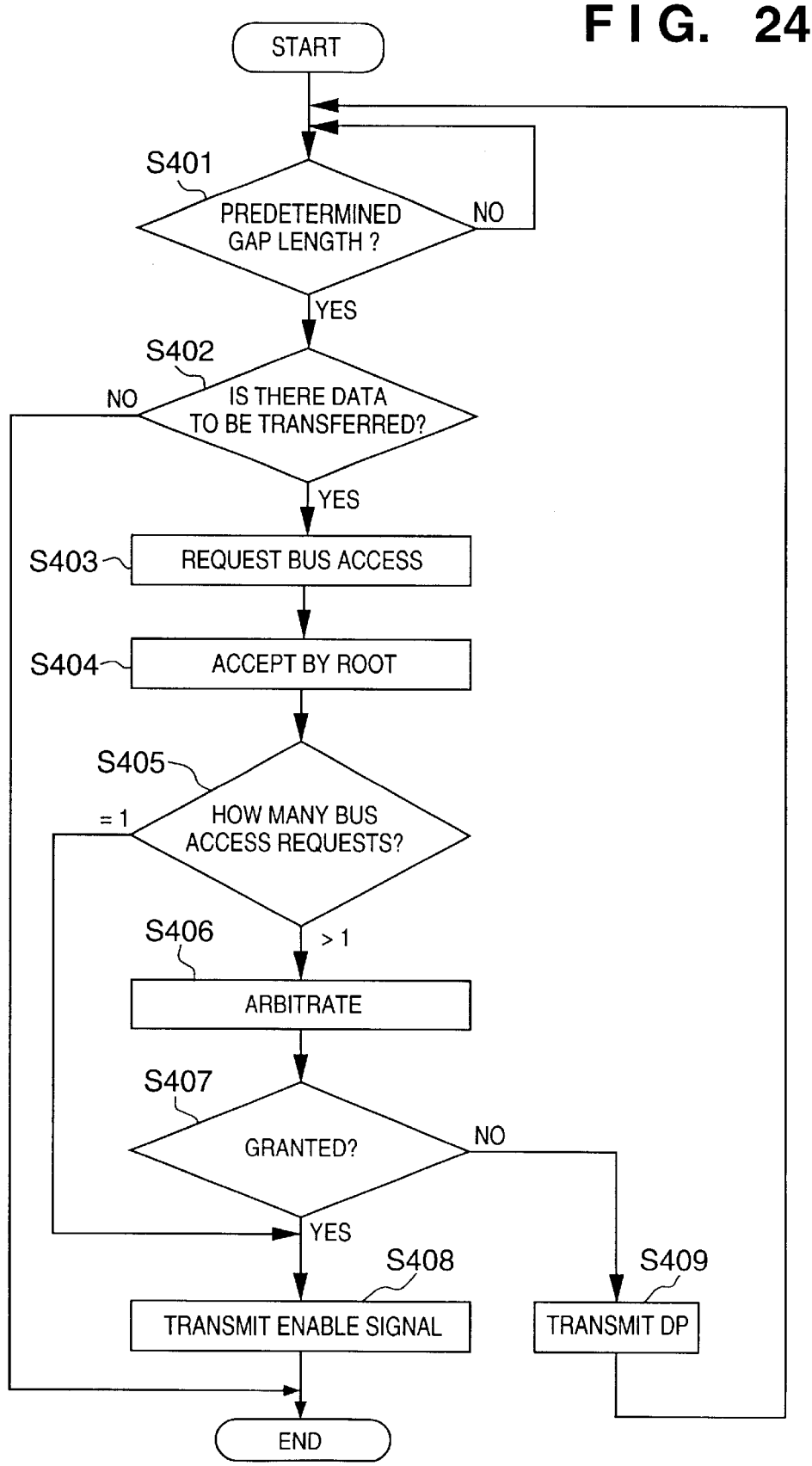
FIG. 24 is a flowchart useful in describing arbitration.

The flow of arbitration will be described with reference to the flowchart of FIG. 24.

In order for a node to start data transfer, it is necessary that the bus be in an idle state. In order to recognize that the bus is currently idle following the end of a data transfer performed previously, each node judges that its own transfer can start based upon elapse of a predetermined idle-time gap length (e.g., a subaction gap) set separately in each transfer mode.

First, at step S401, it is determined whether the predetermined gap length has been obtained. The gap length conforms to the data to be transferred, which is asynchronous data or isochronous data. As long as the predetermined gap length is not obtained, bus access needed to begin a transfer cannot be requested. Accordingly, the node waits until the predetermined gap length is obtained.

If the predetermined gap length is obtained at step S401, it is determined at step S402 whether there is data to be transferred. If there is such data, then, at step S403, the root is sent a bus access request so as to reserve the bus for the transfer. The signal representing the bus access request eventually arrives at the root while being relayed through each device in the network, as shown in FIG. 15. If it is found at step S402 that there is no data to be transferred, the node stands by.

Next, if the root receives one or more bus access requests from step S403 at step S404, then, at step S405, the root checks the number of nodes that issued access requests. If it is found at step S405 that the number of nodes is equal to 1 (i.e., that one node issued a bus access request), then this node is provided with the bus access that will be allowed next. If it is found at step S405 that the number of nodes is greater than 1 (i.e., that a plurality of nodes issued bus access requests), then the root performs arbitration at step S406 to decide one node that is to be granted bus access. This arbitration operation assures that all devices have fair access to the bus and does not grant access only to the same node every time.

This is followed by step S407, at which the one node granted bus access by arbitration performed at step S406 by the root and the other nodes that lost the arbitration are separated from the plurality of nodes that issued the bus access requests. Next, at step S408, the root sends an enable signal to the one node that was granted bus access by arbitration or to a node that obtained bus access without arbitration because it was found at step S405 that the number of nodes requesting access is equal to one. The node that has obtained the enable signal immediately starts transferring data (a packet) that is to be transferred.

A node that lost the arbitration at step S406 and was not granted bus access is sent the DP (Data Prefix) packet, which is indicative of failed arbitration, by the root at step S409. Upon receiving this packet, the node issues the bus access request again in order to perform a transfer. As a result, control returns to step S401 and the node stands by until the predetermined gap length is obtained.

Asynchronous Transfer

Asynchronous transfer is transfer that is not synchronous. FIG. 16 illustrates the state of temporal transition in asynchronous transfer. An initial subaction gap in FIG. 16 indicates the idle state of the bus. At the moment idle time attains a fixed value, a node wishing to perform a transfer judges that the bus can be used and executes arbitration for bus acquisition.

When bus access is granted by arbitration, transfer of data is executed in a packet format. After data is transferred, a node that has received the data responds by sending back acknowledgment "ack" (a code sent back to acknowledge reception) regarding the transferred data, or by sending a response packet, after a short gap referred to as an "ack gap". Here "ack" comprises 4-bit information and a 4-bit checksum. Further, "ack" includes information such as success, busy state and pending state, etc., and is sent back immediately to the node that was the source of the transmission.

FIG. 17 illustrates an example of the packet format for asynchronous transfer.

A packet has a header portion in addition to a data field and data CRC that is for error correction. As shown in FIG. 17, a target node ID, a source node ID, transfer data length and various codes are written in the header in order to be transferred.

Asynchronous transfer is one-to-one communication from one node to another. A packet that has been transferred from a node that was the source of the transfer is delivered to each node in the network. However, since addresses other than a node's own address are ignored, only the one node at the destination is read in.

Isochronous Transfer

Isochronous transfer is transfer that is synchronous. Isochronous transfer, which can be said to be the most significant feature of the 1394 serial bus, is a transfer mode suited to the transfer of data that requires real-time transfer, such as multimedia data composed of video data and audio data.

Whereas asynchronous transfer is one-to-one transfer, isochronous transfer is a transfer from one node that is the source of the transfer to all other nodes by means of a broadcast function.

Figure 18:
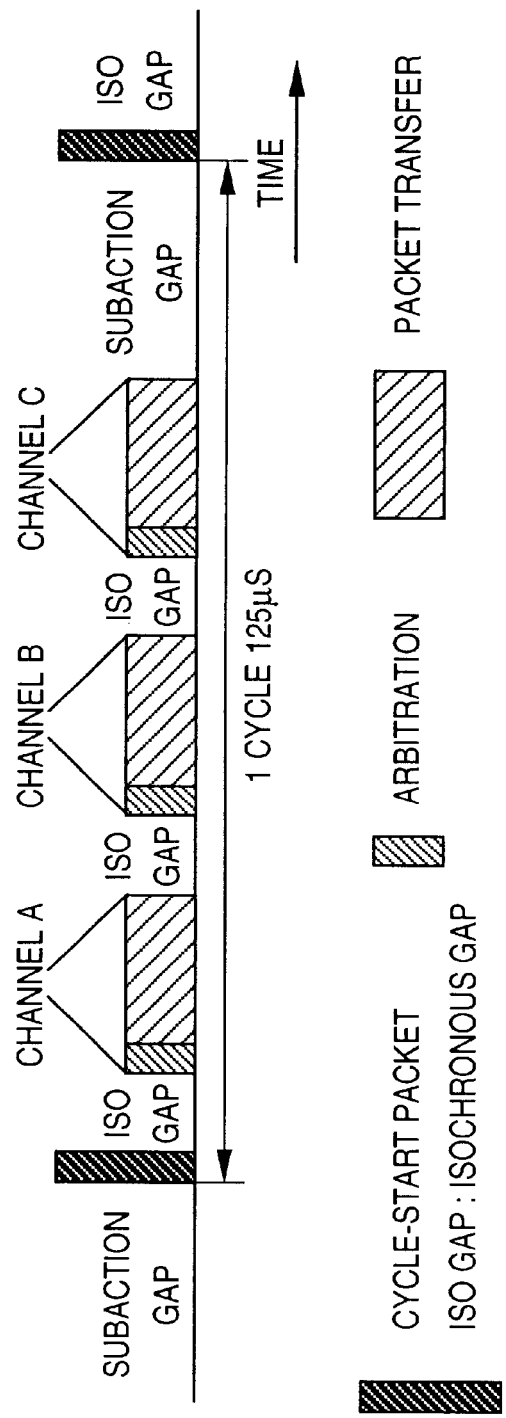
FIG. 18 is a diagram useful in describing isochronous transfer.

FIG. 18 illustrates the state of temporal transition in isochronous transfer.

Isochronous transfer is executed over a bus at fixed times. The time interval is referred to as an "isochronous cycle", the duration of which is 125 $\mu$s. The role of a cycle-start packet is to indicate the starting time of each cycle and to perform a time adjustment for each node.

A node referred to as the "cycle master" transmits the cycle-start packet. The cycle master transmits the cycle-start packet, which informs of the start of the present cycle, upon elapse of a predetermined idle time (the subaction gap) following the end of transfer in the immediately preceding cycle. The time interval in which the cycle-start packet is transmitted is 125 $\mu$s.

In FIG. 18, a plurality of various packets can be transferred in one cycle upon being distinguished from one another by assigning channel IDs to them in the manner of channel A, channel B and channel C, as illustrated. This makes it possible to perform real-time transfer among a plurality of nodes simultaneously. In addition, a receiving node reads in only the data of the ID channel which it itself desires. The channel ID does not represent the address of the transmission destination but merely provides a physical number in regard to data. Accordingly, in transmission of a certain packet, transfer is performed by broadcast in such a manner that the packet is delivered from the one transmission-source node to all of the other nodes.

As in the manner of asynchronous transfer, arbitration is carried out before transmission of a packet in isochronous transfer. However, since this is not one-to-one communication as in asynchronous transfer, "ack" (the code sent back to acknowledge reception) does not exist in isochronous transfer.

Further, the "iso gaps" (isochronous gaps) shown in FIG. 18 represent idle intervals necessary to verify that the bus is idle before an isochronous transfer is performed. When the predetermined idle time elapses, the node wishing to perform the isochronous transfer judges that the bus is idle. As a result, arbitration in advance of transfer can be executed.

Figure 19:
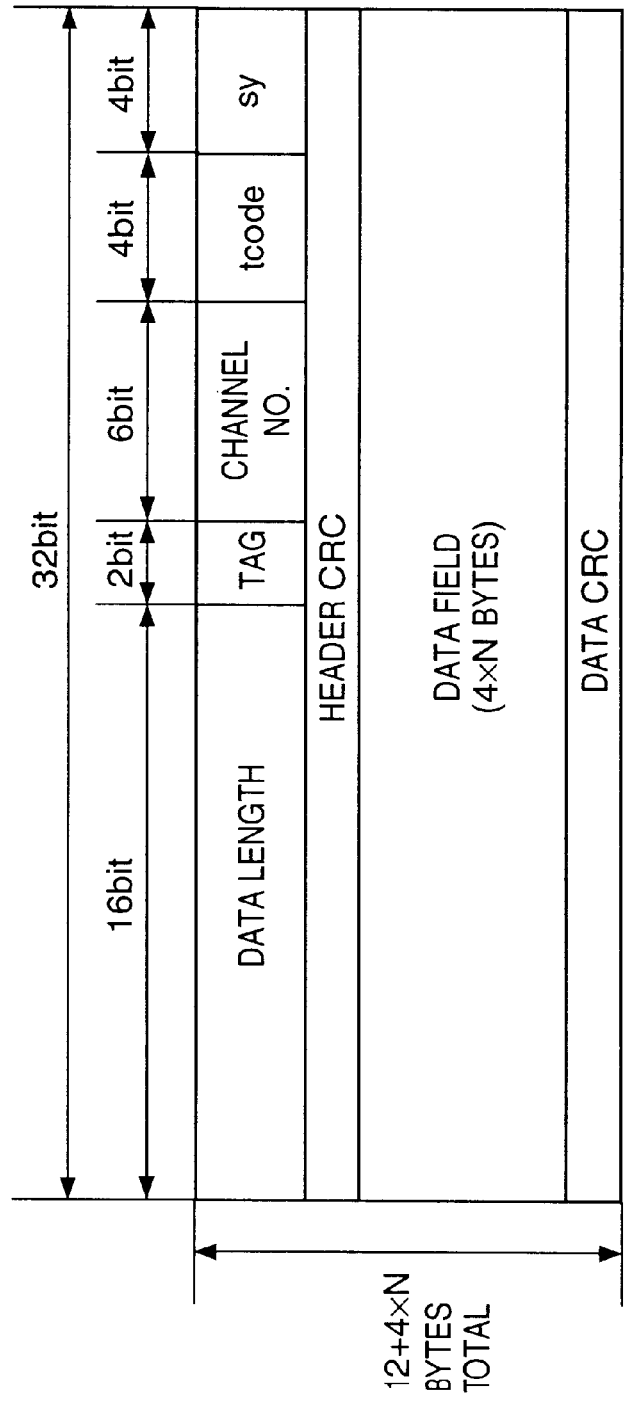
FIG. 19 is a diagram showing an example of packet format in isochronous transfer.

FIG. 19 illustrates an example of the packet format for isochronous transfer.

Each of the various packets classified by their channels has a header portion in addition to a data field and data CRC that is for error correction. As shown in FIG. 19, transfer data length, channel number, various codes and an error correction header CRC are written in the header in order to be transferred.

Bus Cycle

Figure 20:
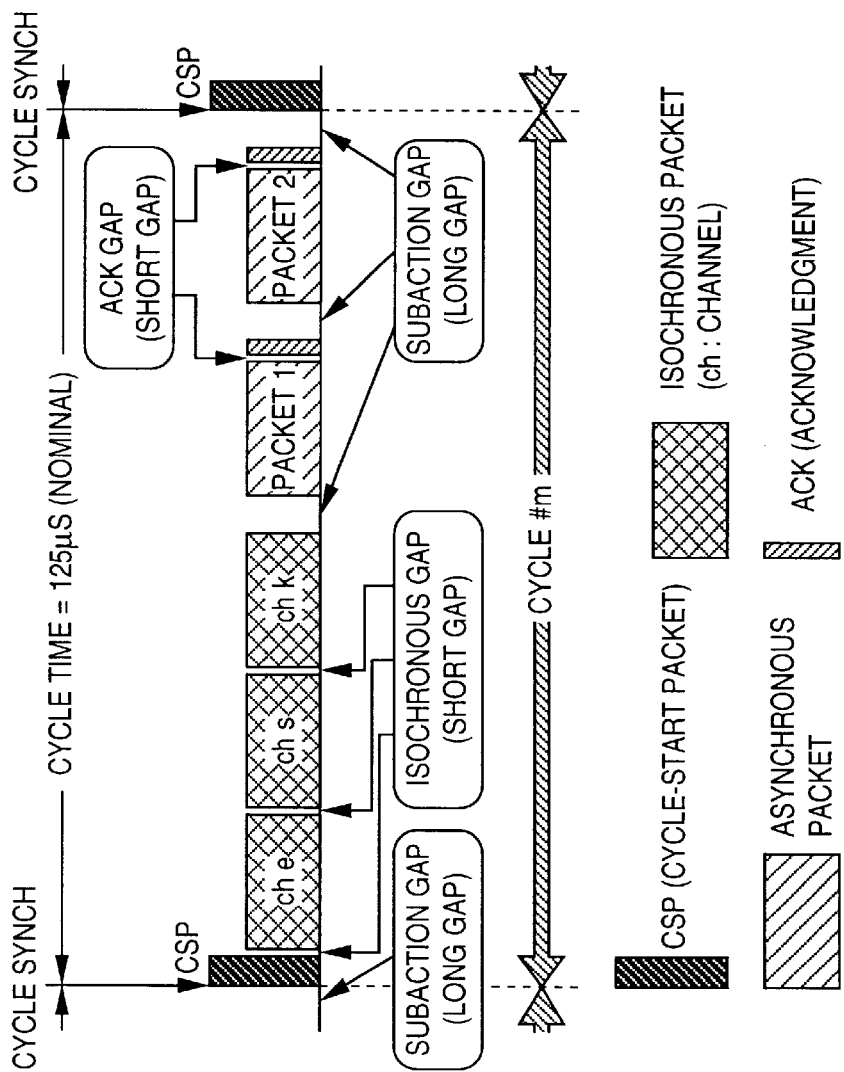
FIG. 20 is a diagram useful in describing a case where isochronous transfer and asynchronous transfer are mixed.

Transfer over an actual 1394 serial bus can be a mixture of isochronous transfer and asynchronous transfer. FIG. 20 illustrates the temporal transition of transfer on a bus over which isochronous transfer and asynchronous transfer are mixed.

Isochronous transfer is performed at a priority higher than that of asynchronous transfer. The reason for this is that after a cycle-start packet is issued, isochronous transfer can be started at a gap length (isochronous gap, or "iso gap") that is shorter than the gap length (subaction gap) of an idle interval necessary to start asynchronous transfer. Accordingly, priority is given to isochronous transfer over asynchronous transfer.

In the usual bus cycle shown in FIG. 20, the cycle-start packet is transferred from the cycle master to each node at the start of cycle #m. As a result, a time adjustment is carried out at each node, a node that is to perform isochronous transfer carries out arbitration after waiting the predetermined idle time (isochronous gap) and then enters the packet transfer phase. In FIG. 20, channel e, channel s and channel k are transferred isochronously in the order mentioned.

After the operation from arbitration to packet transfer has been repeated a number of times equal to the number of channels given and all isochronous transfers in cycle #m end, asynchronous transfer can be carried out.

As a result of idle time becoming equal to the subaction gap that makes asynchronous transfer possible, a node that desires to perform an asynchronous transfer judges that a transition has been made to execution of arbitration. However, asynchronous transfers can be made only in a case where the subaction gap for activating asynchronous transfer is obtained in a period of time from the end of an isochronous transfer to the moment (cycle synch) at which the next cycle-start packet is to be transferred.

In the cycle #m in FIG. 20, three channels of isochronous transfers and the subsequent asynchronous transfers (inclusive of ack) transfer two packets (packet 1 and packet 2). Following the asynchronous packet 2, the time (cycle synch) at which cycle #m+1 is to start arrives. As a result, transfer in cycle #m ends at this point.

However, if the time (cycle synch) at which the next cycle-start packet is to be transmitted has arrived during an asynchronous or isochronous transfer operation, the transfer operation is not forcibly interrupted and the cycle-start packet of the next cycle is transmitted after waiting the idle time that follows the end of transfer. In other words, when the first cycle continues for more 125 $\mu$s, the next cycle is made correspondingly shorter than the standard 125 $\mu$s. That is, the isochronous cycle can be made longer or shorter than the reference 125 $\mu$s.

If isochronous transfer is necessary every cycle in order to maintain real-time transfer, then it is executed without fail. As a result of cycle time being shortened, there are also occasions where asynchronous transfer is held over to the ensuing cycle. Such delay information also is managed by the cycle master.

The forgoing is a description of the 1394 serial bus.

FIG. 2 shows an example of the configuration when respective devices are connected via the 1394 serial bus cable 100.

In FIG. 2, reference numeral 101 denotes a TV monitor; 102, an AV amplifier which is connected to the TV monitor 101 via the 1394 serial bus, selects a specific device from various video and audio devices connected via the 1394 serial bus, and transfers video-audio data from the selected device to the TV monitor 101; 103, a personal computer (to be referred to as a PC) connected to the AV amplifier 102 via the 1394 serial bus; and 104, a printer connected to the PC via the 1394 serial bus.

The PC 103 can receive images from various video devices connected via the 1394 serial bus within a range permitted by laws and the like, and can print out the received images while controlling the printer 104. Reference numeral 105 denotes a first digital VTR connected to the printer via the 1394 serial bus; 106, a second digital VTR connected to the first digital VTR 105 via the 1394 serial bus; 107, a DVD player connected to the second digital VTR 106 via the 1394 serial bus; and 108, a CD player connected to the DVD player via the 1394 serial bus.

Note that the network devices shown in FIG. 2 are merely an example, and the TV monitor 101 and CD player 108 may be further connected to other devices. Any devices, e.g., an external storage device such as a hard disk, second CD player, and second DVD player can be connected so long as they can construct a network via the 1394 serial bus.

An information transmission path including a 1394 I/F will be described by exemplifying I/F connection between the printer 104 and first digital VTR 105 in the network configuration as shown in FIG. 2 with reference to FIG. 3.

Figure 3:
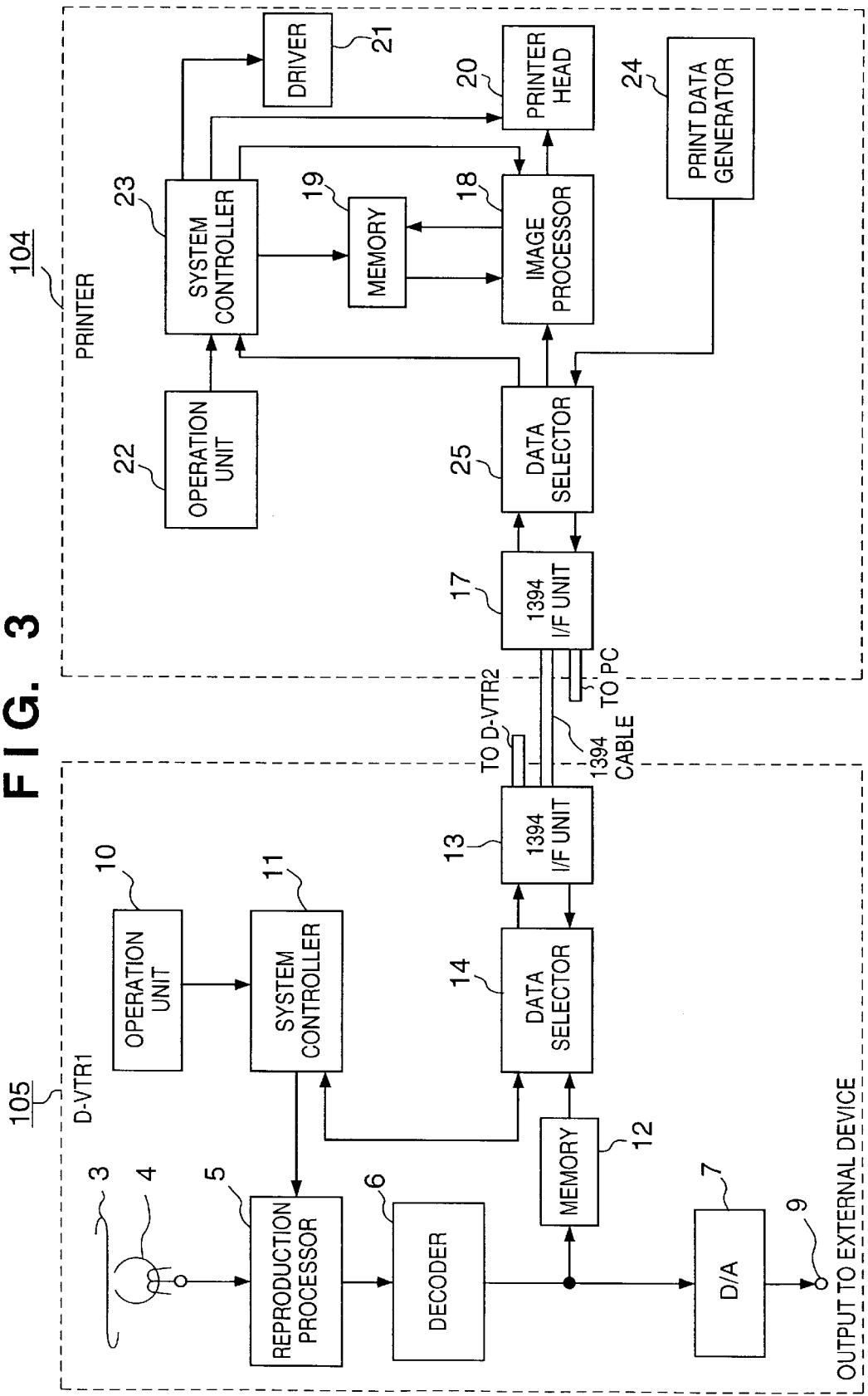
FIG. 3 is a block diagram showing connection between a digital video camera and a printer.

In FIG. 3, the network includes the printer 104 and first digital VTR (to be referred to as a VTR) 105.

In the VTR 105, reference numeral 3 denotes a magnetic tape; 4, a recording/playback head; 5, a playback processing circuit; 6, a video decoding circuit, 7, a D/A converter; 9, an external output terminal; 10, an operation unit for inputting instructions; 11, a system controller; 12, a frame memory; 13, a 1394 interface (I/F); and 14, a selector for a plurality of types of data.

In the printer 104, reference numeral 17 denotes a 1394 interface (I/F); 18, an image processing circuit for forming image data into printing image data; 19, a memory for forming image data into printing image data; 20, a printer head; 21, a driver for feeding paper sheets and the like; 22, an operation unit; 23, a printer controller for controlling the printer; 24, a printer information generator for generating the printer status as printer information in order to transmit the status via the 1394 I/F; and 25, a data selector. FIG. 3 shows only the playback system of the VTR 105.

The operations of the VTR 105 and printer 104 connected as shown in FIG. 2 will be explained.

Video data recorded on the magnetic tape 3 is read by the recording/playback head 4, and subjected to playback processing by the playback processing circuit 5. The read video data is generally recorded after being encoded by a predetermined compression scheme based on DCT (Discrete Cosine Transformation) and VLC (Variable-Length Coding) as band compression methods for home digital videos. Thus, the read video data is subjected to corresponding decoding processing by the decoding circuit 6, converted into an analog signal by the D/A converter 7, and output to an external device via the external output terminal 9.

When desired video data or the like is to be transferred to another node using the 1394 serial bus, video data decoded by the decoding circuit 6 is temporarily stored in the frame memory 12, sent to the 1394 I/F 13 via the data selector 14, and transferred to, e.g., the printer 104 and PC 103. The data selector 14 transfers various control data from the system controller 11 to the 1394 I/F 13 in addition to the video data.

If the transferred data is direct-printing data output to the printer 104, the printer 104 receives this video data; and if the data is to be transferred to another node such as the PC 103, it is transferred to the next node through the 1394 I/F 17.

In the VTR 105, a VTR instruction such as a playback operation instruction is input via the operation unit 10. The system controller 11 controls various operation units including the playback processing circuit 5 on the basis of an instruction input via the operation unit 10. For a predetermined instruction input, the system controller 11 generates a control command for, e.g., the printer 104, and transfers it as command data from the 1394 I/F 13 to the printer 104 via the data selector 14.

Printer information data such as the printer operation status sent from the printer 104 via the 1394 serial bus can be input from the 1394 I/F 13 to the system controller 11 via the data selector 14. If the printer information data is not necessary for the VTR 105, it is transferred to the second digital VTR 106 through the VTR 105. The printer information can also be transferred from the 1394 I/F 17 to the PC 103.

The data selector 14 of the VTR 105 and the data selector 25 of the printer 104 select input data or output data. The data selectors 14 and 25 sequentially classify respective data into the types of data, and input/output them to/from predetermined blocks.

In the printer 104, data input via the 1394 I/F 17 are classified into the types of data by the data selector 25. Data to be printed is input to the image processing circuit 18. The image processing circuit 18 performs image processing suited to the printer for input data to form printing image data, and stores the printing image data in the memory 19 controlled by the printer controller 23. The printing image data is sent from the memory 19 read-controlled by the printer controller 23 to the printer head 20 which prints the data.

The driver 21 drives the printer head 20 and feeds paper sheets. The operations of the driver 21 and printer head 20 are controlled by the printer controller 23. The operation unit 22 allows inputting instructions for paper feed, reset, ink check, printer operation such as standby/stop operation. The printer controller 23 controls respective units in accordance with an instruction input via the operation unit 22.

When data input to the 1394 I/F 17 indicates a command to the printer 104 generated from the PC 103, VTR 105 or the like, the data is transmitted as a control command to the printer controller 23 via the data selector 25, and the printer controller 23 controls respective printer portions corresponding to the control command.

The printer information generator 24 outputs, as printer information, a message representing the printer operation status and printing end/start enable state, a warning message representing a paper sheet jam, operation error, presence/absence of ink, or the like, and printing image information. This printer information is transferred to the data selector 25, then externally output via the 1394 I/F 17.

The PC 103 and VTR 105 perform display and processing corresponding to the printer status on the basis of the output printer information. A user watches a message and printing image information displayed on the PC 103 (also on the VTR 105 if it has a direct-printing function) based on the printer information. The user inputs a command for the printer 104 via the PC 103 (and VTR 105) in order to appropriately deal with the status. The input command is transmitted as control command data via the 1394 serial bus. Based on this control command, the printer controller 23 can control the operations of the respective portions of the printer 104 and printing image data in the image processing circuit 18.

In this manner, video data, various command data, and the like are transferred onto the 1394 serial bus which connects the PC 103, VTR 105, and printer 104. The transfer format of data transferred from the VTR 105 is based on the above-described 1394 serial bus specifications. Video data (and audio data) is mainly transferred as Iso data on the 1394 serial bus by an isochronous transfer scheme, and command data is transferred as Async data by an asynchronous transfer scheme.

A certain type of data may be transferred by the asynchronous transfer scheme better than the isochronous transfer scheme. In this case, the asynchronous transfer scheme is used.

Printer information data transferred from the printer 104 is transferred as Async data by the asynchronous transfer scheme. However, printing image data having a large amount of information may be transferred as Iso data by the isochronous transfer scheme.

When the network as shown in FIG. 2 is constructed by the 1394 serial bus, both the VTR 105 and printer 104 can bidirectionally transfer data to the PC 103, VTR 106, DVD player 107, CD player 108, AV amplifier 102, TV monitor 101, and the like on the basis of the 1394 serial bus specifications.

The TV monitor 101, AV amplifier 102, PC 103, VTR 106, DVD player 107, and CD player 108 have unique function controllers. In these devices, however, the portions necessary for information communication via the 1394 I/F, i.e., the data selector for receiving data to be transmitted from respective blocks within the device and properly distributing the received data to respective blocks within the device, and the 1394 I/F are the same as in the VTR 105 and printer 104.

First Embodiment

Figure 1:
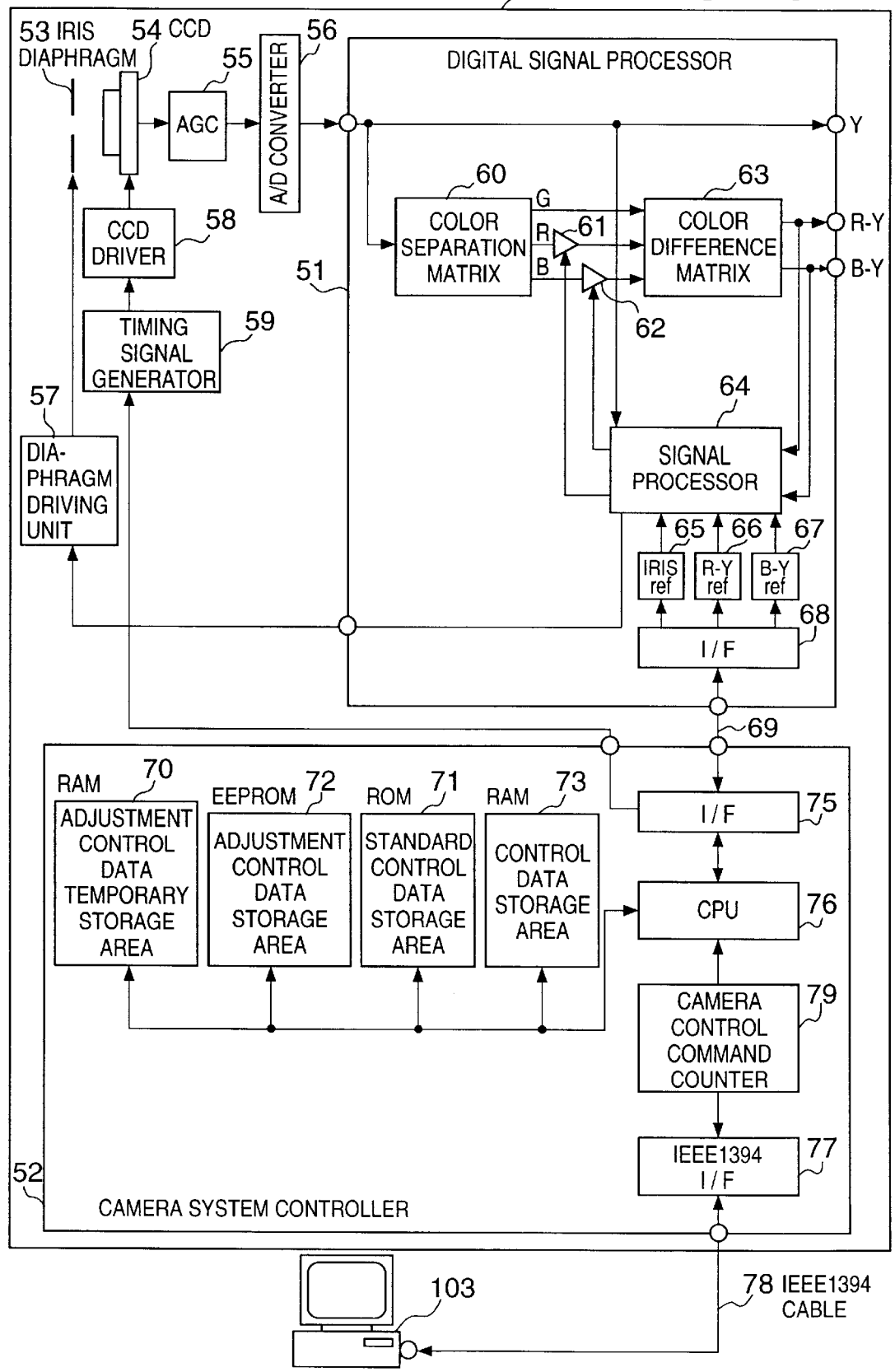
FIG. 1 is a block diagram showing a construction of a video camera including an IEEE 1394-compliant serial I/F, according to first to third embodiments of the present invention.

FIG. 1 is a block diagram showing a system of a video camera 50 according to the first embodiment of the present invention, which serves as an electronic device including the IEEE 1394 serial I/F.

The video camera 50 mainly comprises: an image sensing unit, a digital signal processor 51, and a camera system controller 52. The image sensing unit includes: an optical lens unit (not shown), an iris diaphragm 53, a CCD 54, an automatic gain controller (AGC) 55, an A/D converter 56, a diaphragm driving unit 57, a CCD driver 58, and a timing signal generator 59.

An optical image of an object formed on an image forming surface of the CCD 54 through the optical lens unit and iris diaphragm 53 is photoelectrically converted to an electric signal, and the obtained electric signal is gain-controlled by the AGC 55 and converted to a digital signal by the A/D converter 56. Among image signals inputted from the A/D converter 56 to the digital signal processor 51, luminance component Y is compared in a signal processor 64 with a level of a reference signal which is generated by a diaphragm control reference signal generator 65 (to be referred to as a diaphragm signal generator 65). The comparison result is outputted to the diaphragm driving unit 57. By this, the iris diaphragm is automatically controlled to always select an appropriate aperture value with respect to image sensing light.

Color signal components of the image signal, inputted to the digital signal processor 51 from the A/D converter 56, are inputted to a color separation matrix 60. In the color separation matrix 60, color signal components of the signal outputted by the A/D converter 56 are separated into three color components R, G and B, and particularly the levels of R and B color components are respectively controlled by level controllers 61 and 62. The R and B color signal components whose levels are controlled and G color signal component are converted to color difference signals of R-Y and B-Y by a color difference matrix 63.

Next, in the signal processor 64, the R-Y and B-Y color difference signal levels are compared respectively to levels of reference signals generated by an R-Y level control reference signal generator 66 and B-Y level control reference signal generator 67 (to be respectively referred to as an R-Y signal generator 66 and B-Y signal generator 67). The comparison results are outputted to the level controllers 61 and 62, thereby automatically controlling the levels of R and B color components so as to always achieve an appropriate white balance.

The time for accumulating a charge in each cell of the CCD 54, i.e., shutter speed, is controlled by a CCD driving signal supplied from the timing generator 59 to the CCD 54 through the CCD driver 58. The charge accumulated in each cell of the CCD 54 corresponds to the amount of light of an optical image formed on the CCD's image forming surface. The timing generator 59, connected to an I/F 75 of the camera system controller 52, controls charge accumulation time of the CCD in accordance with a control command sent by a CPU 76 of the camera system controller 52.

Also, the video camera is so structured that output levels of the diaphragm signal generator 65, R-Y signal generator 66, and B-Y signal generator 67 are variable by a control signal transmitted by the camera system controller 52 through an I/F 68.

The camera system controller 52 is capable of communicating with a PC 103, provided outside the video camera, through an IEEE 1394 cable 78 and an IEEE 1394 I/F 77. In accordance with a camera control command from the PC 103, the CPU 76 outputs a signal to change output levels of the diaphragm signal generator 65, R-Y signal generator 66, or B-Y signal generator 67, thereby changing an aperture value, R-Y or B-Y control reference values. Accordingly, the control target of the camera unit, e.g., an aperture value, hue, saturation and so forth, can be controlled from outside the camera.

Reference values for output levels of the diaphragm signal generator 65, R-Y signal generator 66, or B-Y signal generator 67 are stored in a standard control data storage area 71 of ROM. Normally, data stored in the area 71 is temporarily transferred to a control data storage area 73 of RAM through the CPU 76, then further transmitted to each of the aforementioned circuits 65, 66 and 67 as a control condition through the CPU 76, and an appropriate image sensing condition is automatically set.

Note that camera control commands from the PC 103 include various camera control commands (PC commands) sandwiched between the PC-mode-start command and PC-mode-end command as shown in FIG. 4A. In general camera control, a variety of camera controls corresponding to a plurality of control parameters need to be performed while keeping them in balance. Therefore, aforementioned various camera control commands are not executed one at a time, but the group of commands sandwiched between the start and end commands are all executed in parallel.

When the controlled subject of the camera unit is controlled from the PC 103, a camera control command transmitted from the PC 103 to the IEEE 1394 I/F 77 is subjected to the processing of a camera control command counter 79 in which a counter is incremented by 1 per command, and then transferred to the CPU 76. In the CPU 76, the camera control command is converted to corresponding data, and transferred to RAM 70 to be stored temporarily as temporary-stored adjustment control data.

The foregoing operation is repeated from the detection of a PC-mode-start command till the detection of a PC-mode-end command. When a PC-mode-end command is detected, the temporary-stored adjustment control data is transferred to non-volatile memory EEPROM 72 through the CPU 76 to be stored as adjustment control data, and then outputted to the digital signal processor 51 through the CPU 76 and I/F 75.

Control data corresponding to the data outputted to the digital signal processor 51 through the CPU 76 and I/F 75 is also stored in the control data storage area 73 of the RAM, and when it is necessary, the control data is read out of the control data storage area 73 of the RAM by the CPU 76. By this, camera control data once transmitted from the PC 103 is stored within the video camera 50 and the setting can be called up when necessary.

The CPU 76 controls addresses of the RAM, ROM and EEPROM and read/write operation. When the camera unit is to be set to an image sensing condition designated by the PC 103, data stored in the EEPROM 72 is written in the control data storage area 73, whereas when the camera unit is to be set to a standard condition, data stored in the standard control data storage area 71 is written in the control data storage area 73.

When the video camera 50 and PC 103 are connected by the IEEE 1394 cable 78, the connection is recognized and determination is made as to whether or not to start camera control operation by the PC 103.

Figure 5A:
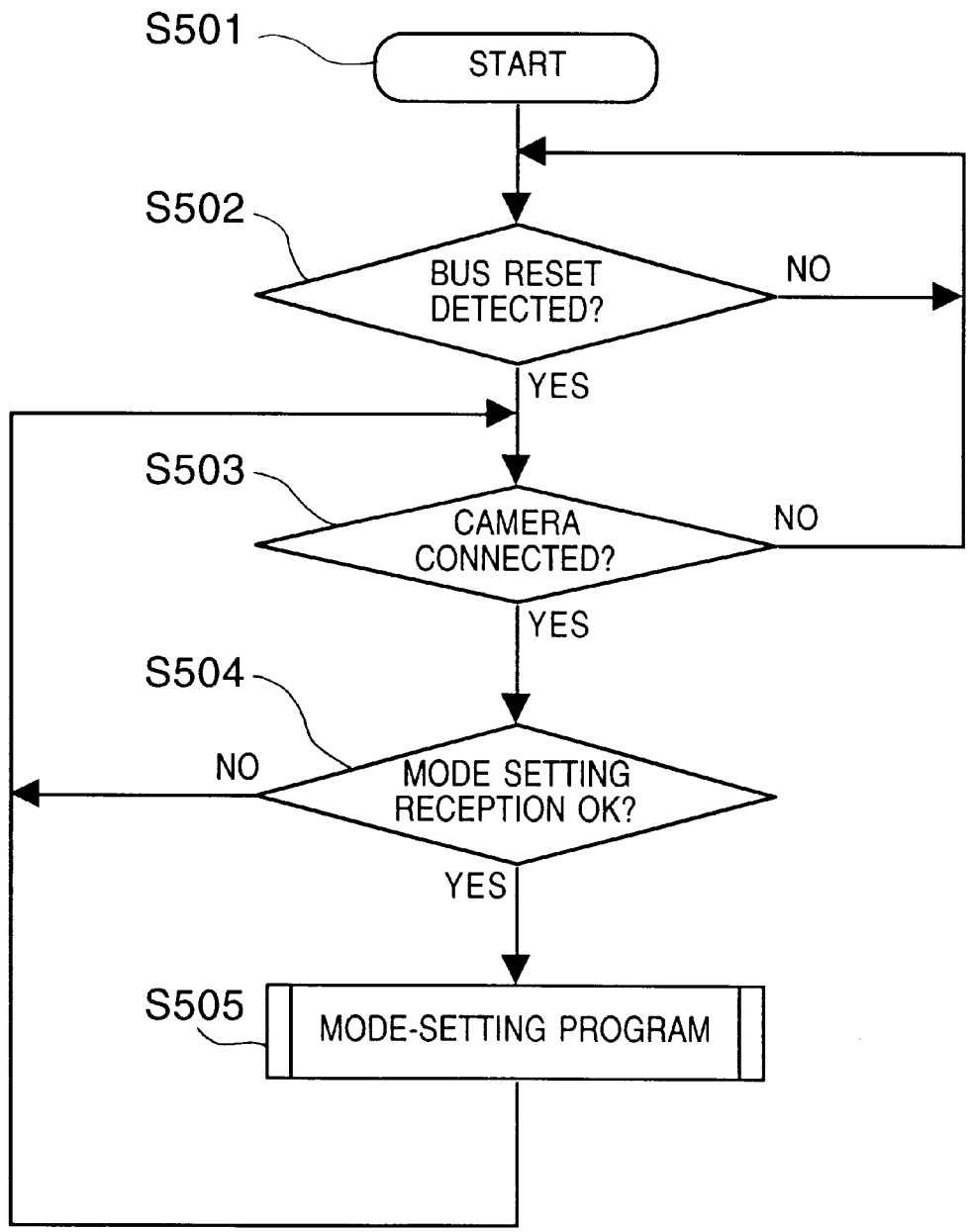
FIGS. 5A to 5C are flowcharts showing operation of a PC and a video camera according to the first embodiment of the present invention.
Figure 5B:
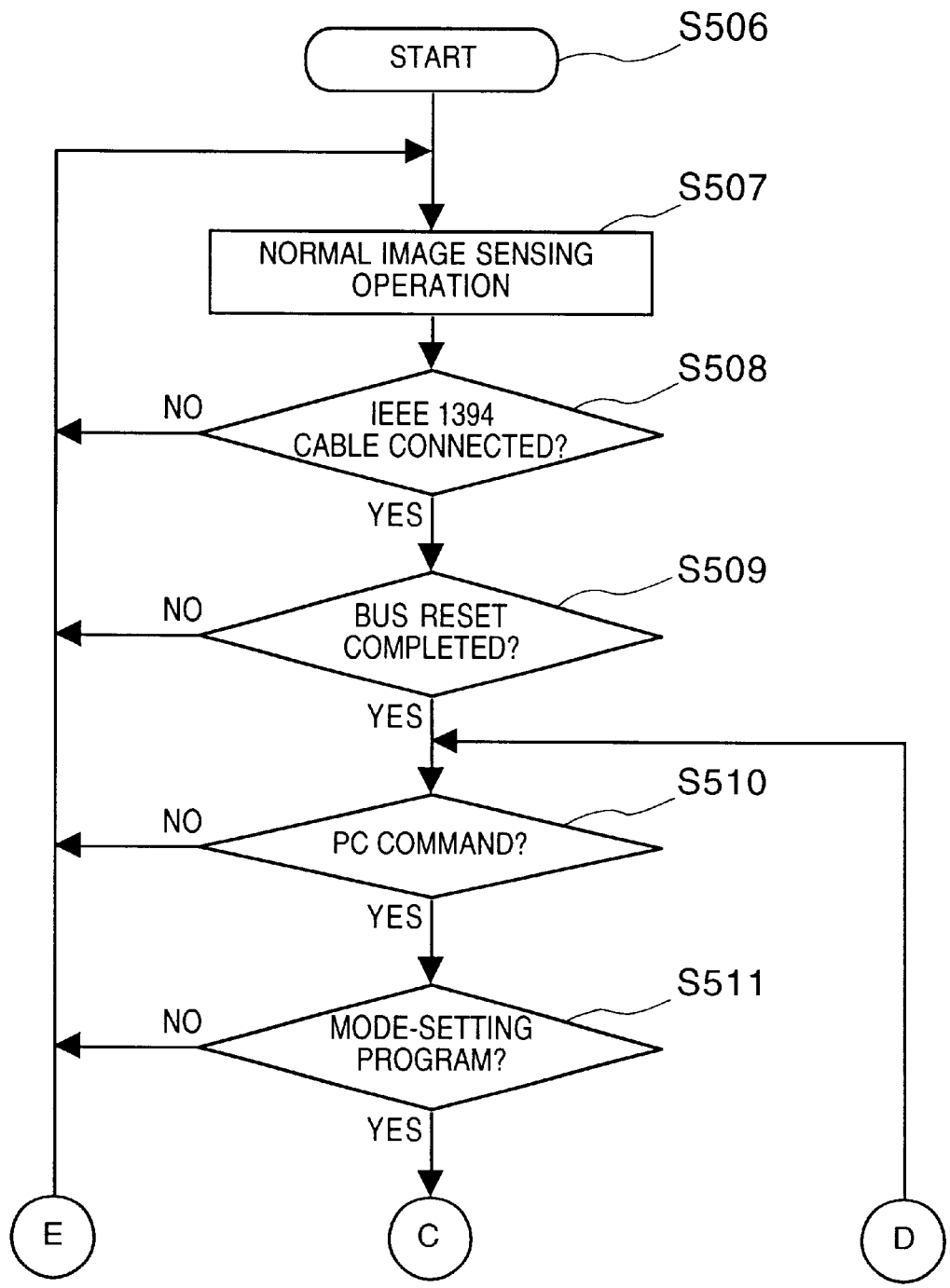

FIGS. 5A and 5B are flowcharts showing operation of the video camera 50 and PC 103 according to the first embodiment.

Referring to FIG. 5A, on the PC 103 side, when the processing in step S501 starts, whether or not the IEEE 1394 cable is connected is determined by detecting occurrence of bus reset in step S502. If bus reset has not occurred, the control stands without executing any processing. If bus reset has occurred, it is determined in step S503 whether or not the video camera 50 is connected. To determine whether or not the video camera 50 is connected, for instance, 64-bit address in the address space of the aforementioned 1394 serial bus of the video camera shown in FIG. 9 is read out and its contents are used to determine whether or not the connected device is the video camera subjected to controlling.

If determination is made in step S503 that a video camera 50 subjected to controlling is not connected, the control returns to step S502. If determination is made in step S503 that the video camera 50 is connected, it is determined in step S504 whether or not the video camera 50 is in a state for receiving a mode-setting command from the PC 103. Herein, the state for receiving a mode-setting command is when the video camera 50 is not in the tape-replay mode, i.e., the video camera 50 is in the image sensing mode, or the video camera 50 is not in various automatic modes (not shown) but in a manual-setting mode in which a mode-setting command can be received. This state depends upon the video camera.

If determination is made in step S504 that the video camera 50 is not in the state for receiving a mode-setting command, the control returns to step S503 where it is confirmed that the video camera 50 subjected to controlling is still connected, and the processing in step S504 is executed again. When determination is made in step S504 that the video camera 50 is in the state for receiving a mode-setting command, in step S505, a mode-setting command is transferred from the PC 103 to control the video camera 50 from the PC 103.

Figure 5C:
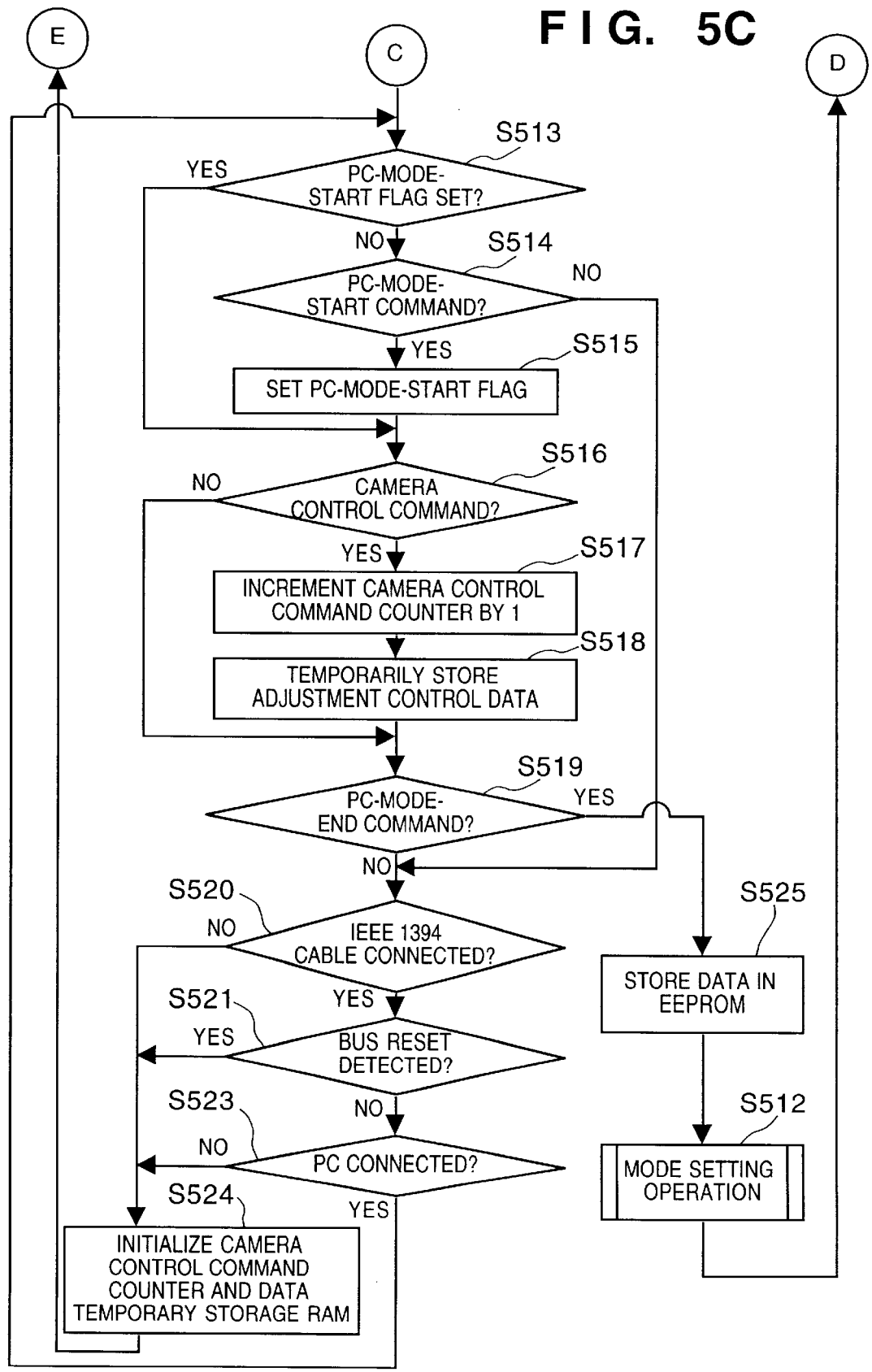

Meanwhile, referring to FIGS. 5B and 5C, the video camera 50 executes normal image sensing operation in step S507 when the processing execution starts in step S506. Note that the normal image sensing operation is an operation performed in a state where standard control data in the storage area 71 has been written in the control data storage area 73 shown in FIG. 1. While executing the normal image sensing operation, the CPU 76 monitors, in step S508, whether or not the IEEE 1394 cable is connected. To detect connection of the IEEE 1394 cable, for instance, a change in a bias voltage of the port is detected.

If connection of the IEEE 1394 cable is not confirmed in step S508, the control returns to step S507. If cable connection is confirmed, the control waits for bus reset completion in step S509, and then it is determined in step S510 whether or not the PC 103 is connected. To determine whether or not a connected device is the PC 103, for instance, as similar to the operation performed in the PC 103, 64-bit address in the address space of the 1394 serial bus of the video camera shown in FIG. 9 is read out and its contents are used to determine whether or not the connected device is the PC 103.

Figure 8:
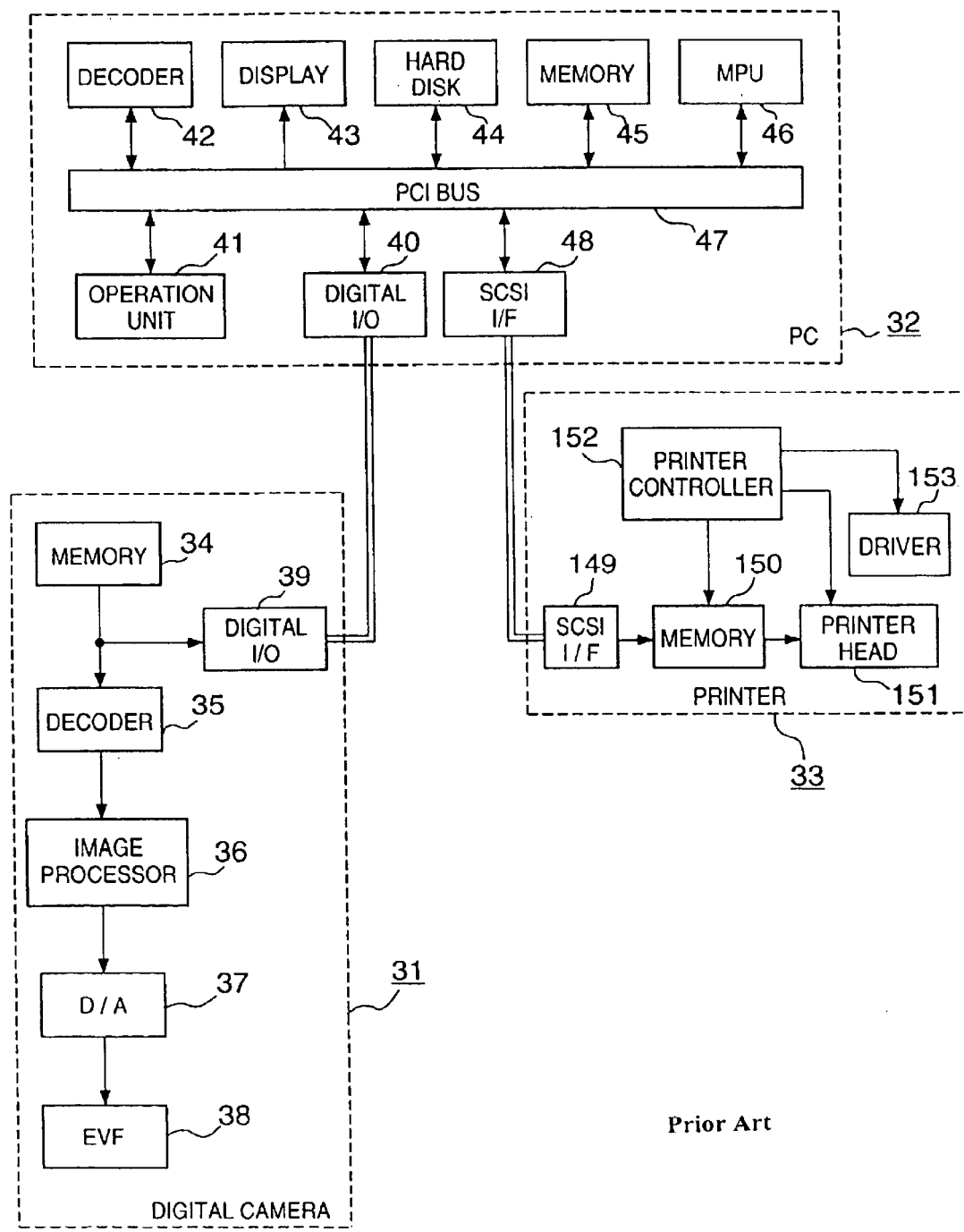
FIG. 8 is a block diagram showing a construction of a conventional data communication system employing SCSI.

When the connected device is the PC 103 (YES in step S510), it is determined in step S511 whether or not a mode-setting program is operating in the PC 103. To determine this, for instance, application layer data in FIG. 8 is read, or asynchronous data is recognized by two-way communication.

If determination is made in step S511 that the mode-setting program is operating in the PC 103, it is confirmed in step S513 whether or not a PC-mode-start flag is set. If the flag is set, the control proceeds to step S516, but if the flag is not set, it is determined in step S514 whether or not a PC-mode-start command is detected. If a PC-mode-start command is detected, a PC-mode-start flag is set in step S515; otherwise, the control proceeds to step S520.

In step S516, an attribute of the received command is determined. If the received command is a camera control command, the camera command counter is incremented by 1 in step S517, and the data is stored in the adjustment control data temporary storage area 70 in step S518.

In step S519, it is determined whether or not a received command is a PC-mode-end command, and if so, the control branches to step S525 where the control data temporarily stored in the storage area 70 is transferred and stored in the adjustment control data storage area 72 (EEPROM). In step S512, mode-setting operation of the video camera is executed by changing the control reference value or shutter speed according to a command from the PC 103 as described above, or by rewriting the contents of RAM. After completing the mode-setting operation, the control returns to step S510 and repeats the series of PC-mode operation.

On the video camera 50 side, each of the determination processing in steps S508 to S511 is sequentially executed to determine whether or not to execute mode-setting operation according to a command from the PC 103. When a condition is not satisfied in any of the above determination steps, the control returns to step S507 and performs operation not complying with the command from the PC 103, i.e., normal image sensing operation.

Processing for dealing with a communication error during the PC-mode operation is performed in steps S520, S521 and S523. More specifically, in step S520, connection of the 1394 serial bus is determined, and if 1394 serial bus is not connected, the control branches to step S524. In step S521, bus reset detection is performed, and if bus reset is detected, the control branches to step S524. In step S523, PC connection is determined, and if a PC is not connected, the control branches to step S524. Besides the above cases, the control returns to step S513 to perform the series of processing for a camera control command.

In step S524, the processing is performed for a communication error occurred during PC-mode operation. More specifically, the camera control command counter, adjustment control data temporary storage area 70, and adjustment control data storage area 72 are initialized, then camera control commands received before shifting to the PC-mode setting operation in step S512 are all nulled, and the control returns to step S507 for performing operation not complying with the command from the PC 103, i.e., normal image sensing operation.

As has been described above, according to the present invention, in a case where communication errors occur during PC-mode setting of an electronic device such as a video camera or the like which can be controlled by an external control apparatus such as a PC, control data stored in a temporary storage area is all cleared, and the electronic device is controlled based on control data stored in a non-volatile memory or standard data storage. Accordingly, even if communication errors occur, an electronic device can be normally controlled.

Second Embodiment

Figure 6A:
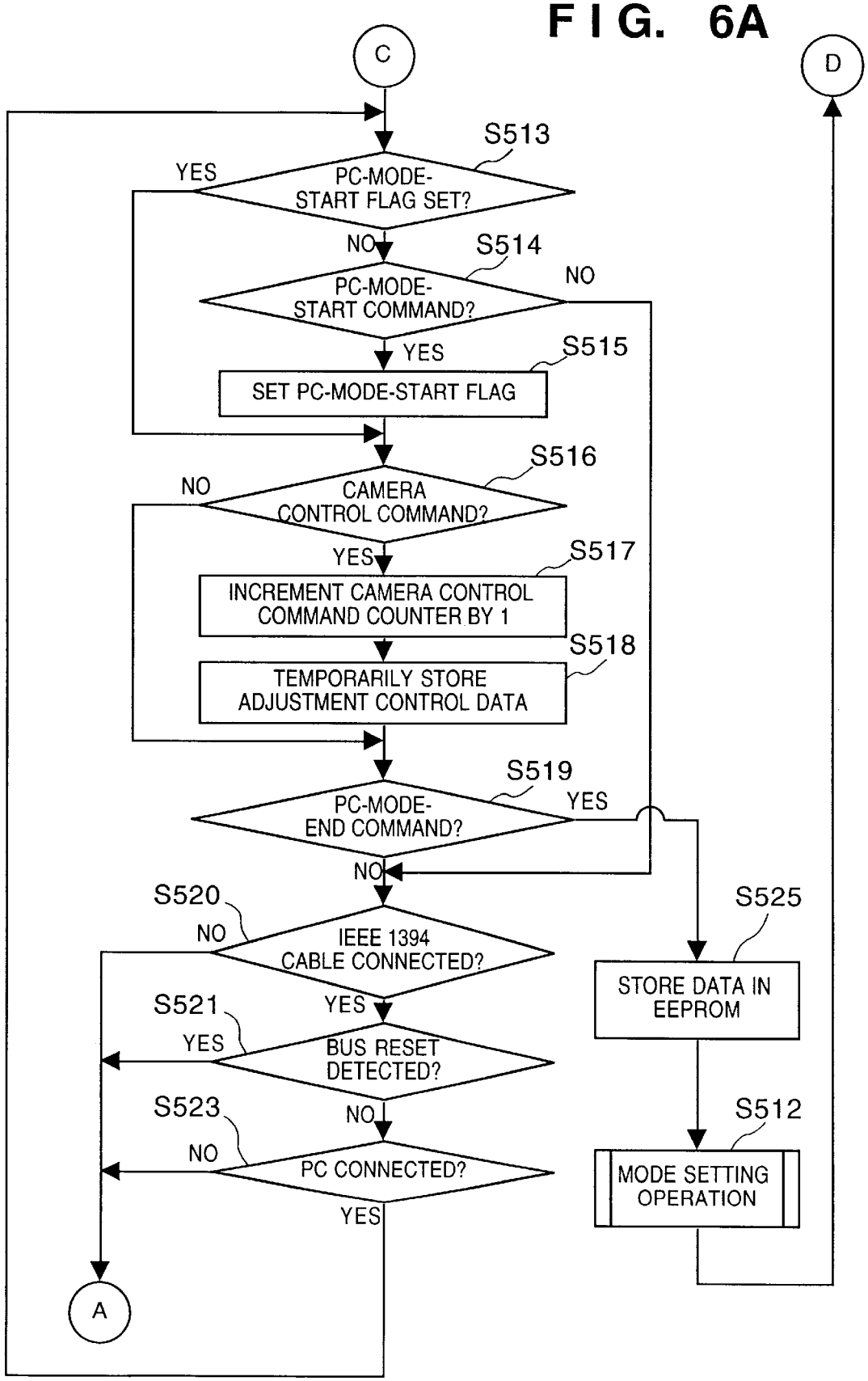
FIGS. 6A and 6B are flowcharts showing operation of a video camera according to the second embodiment of the present invention.
Figure 6B:
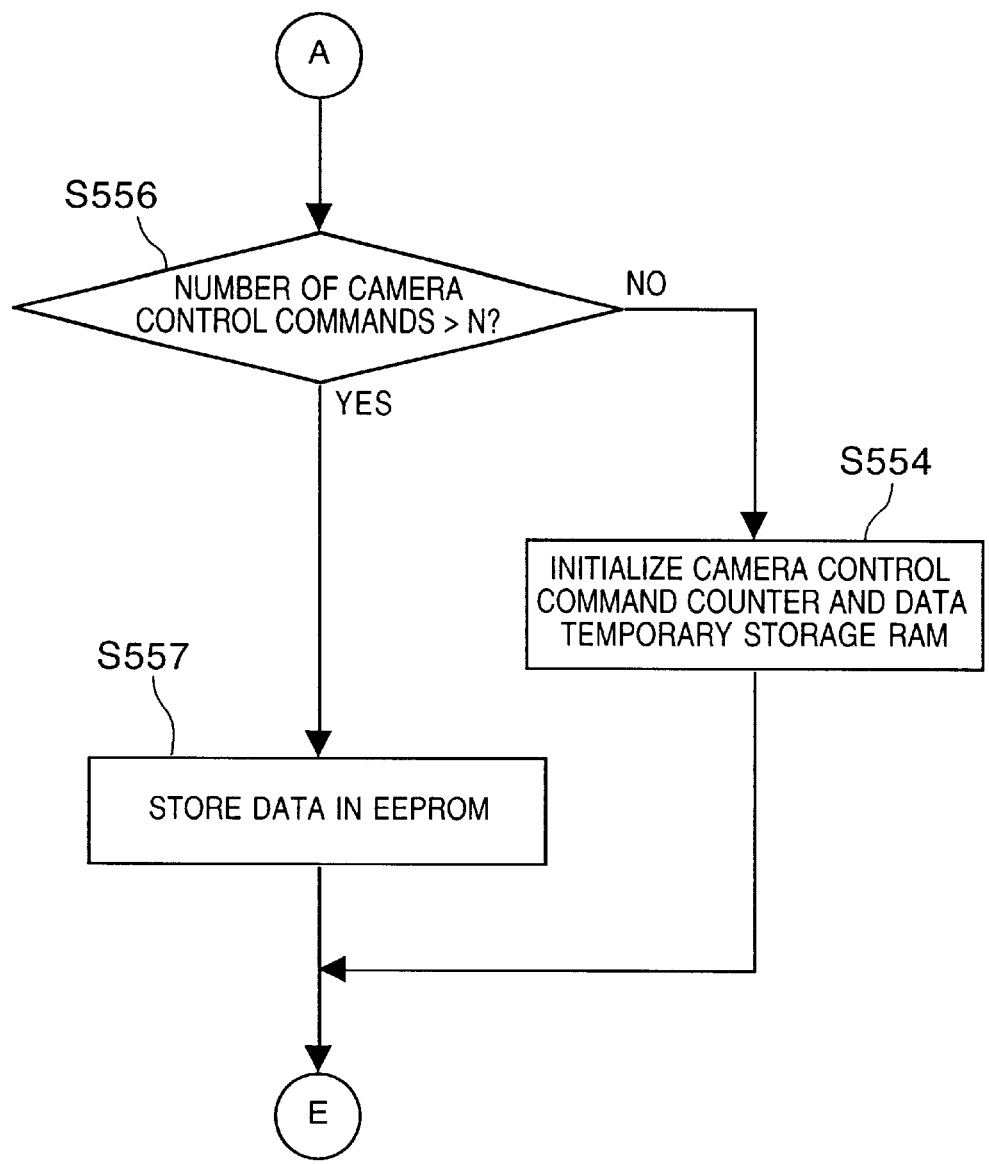

FIGS. 6A and 6B are flowcharts showing operation of the video camera 50 and PC 103 according to a second embodiment of the present invention. Note that the video camera 50 and PC 103 have the same construction as that shown in FIG. 1.

In the second embodiment, since operation of the PC 103 is the same as that described in the first embodiment with reference to FIGS. 5A to 5C, the description will be omitted. Moreover, besides the processing in a case of a communication error during the PC-mode operation (i.e., control proceeding to NO in steps S520 or 523, or YES in step S521), since operation of the video camera 50 is the same as that described in the first embodiment with reference to FIG. 5A, the same step numbers are assigned and description thereof will be omitted.

Referring to FIG. 6A, when a communication error is detected during the PC-mode operation in any of steps S520, S521 or S523, the control branches to step S556 in FIG. 6B where the counted number in the camera control command counter 79 is compared with a predetermined threshold value. If the counted number is equal to or larger than the predetermined threshold value, adjustment control data which has been temporarily stored in the adjustment control data temporary storage area 70 up to this point is stored in the adjustment data storage area 72 of the EEPROM shown in FIG. 1 as final adjustment data in step S557, then the control returns to step S507 in FIG. 5B.

If the counted number is smaller than the predetermined threshold value, the camera control command counter 79 and adjustment control data temporary storage area 70 are initialized in step S554. Thus, received camera control commands are all nulled without being transferred to the adjustment data storage area 72, and then the control returns to step S507 for performing operation not complying with the command from the PC 103, i.e., normal image sensing operation.

An example of setting the aforementioned threshold value is described below.

As mentioned above, the camera control commands from the PC 103 are various camera adjustment control data (PC command) sandwiched between the PC-mode-start command and PC-mode-end command as shown in FIG. 4A. In general camera control, a plurality of control parameters need to be controlled while keeping them in balance. Therefore, aforementioned various camera control commands are not executed one at a time, but basically the group of commands sandwiched between the start and end commands are all executed in parallel.

However, in the second embodiment, by transferring the PC commands from the PC after categorizing the commands into "basic performance/basic setting command" and "small adjustment command" according to their contents as shown in FIG. 4B, the threshold value can be set based on the number "11" in the case as shown in FIG. 4B. More specifically, when an error is detected in the above-described step, if the counted number in the camera control command counter is 11 or more, it indicates that the reception of PC commands related to camera's basic performance/basic setting is completed. Therefore, even if the adjustment control data temporarily stored up to this point is used as final adjustment data, the basic operation balance of the camera will be maintained.

On the other hand, when the counted number in the camera control command counter is less than 11, if the adjustment data temporarily stored is used as final adjustment data, the basic operation balance of the camera will be lost. For this reason, these data are initialized to be nulled.

As has been described above, when a communication error is detected while the number of items of control data received from an external control device is counted, the counted number is compared with a threshold value. If the counted number of items of control data received up to this point is smaller than the threshold value, the control data stored in the temporary storage area is all cleared. Otherwise, the control data stored in the temporary storage area is stored in a non-volatile memory. By virtue of the above processing, even if a communication error occurs, an electronic device can be normally controlled. In addition, recovery processing after occurrence of a communication error is realized.

Third Embodiment

Figure 7A:
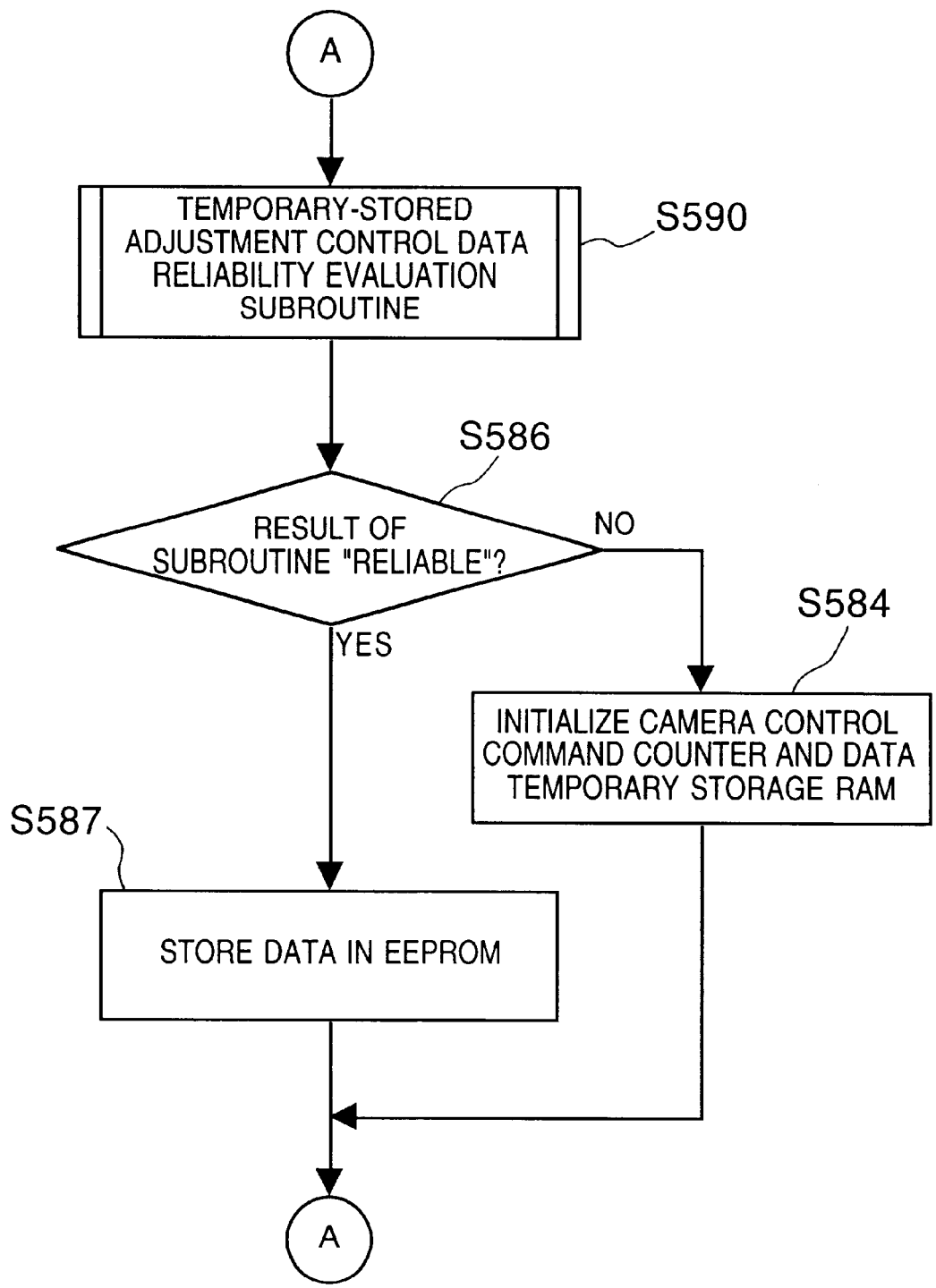
FIGS. 7A and 7B are flowcharts showing operation of a video camera according to the third embodiment of the present invention.
Figure 7B:
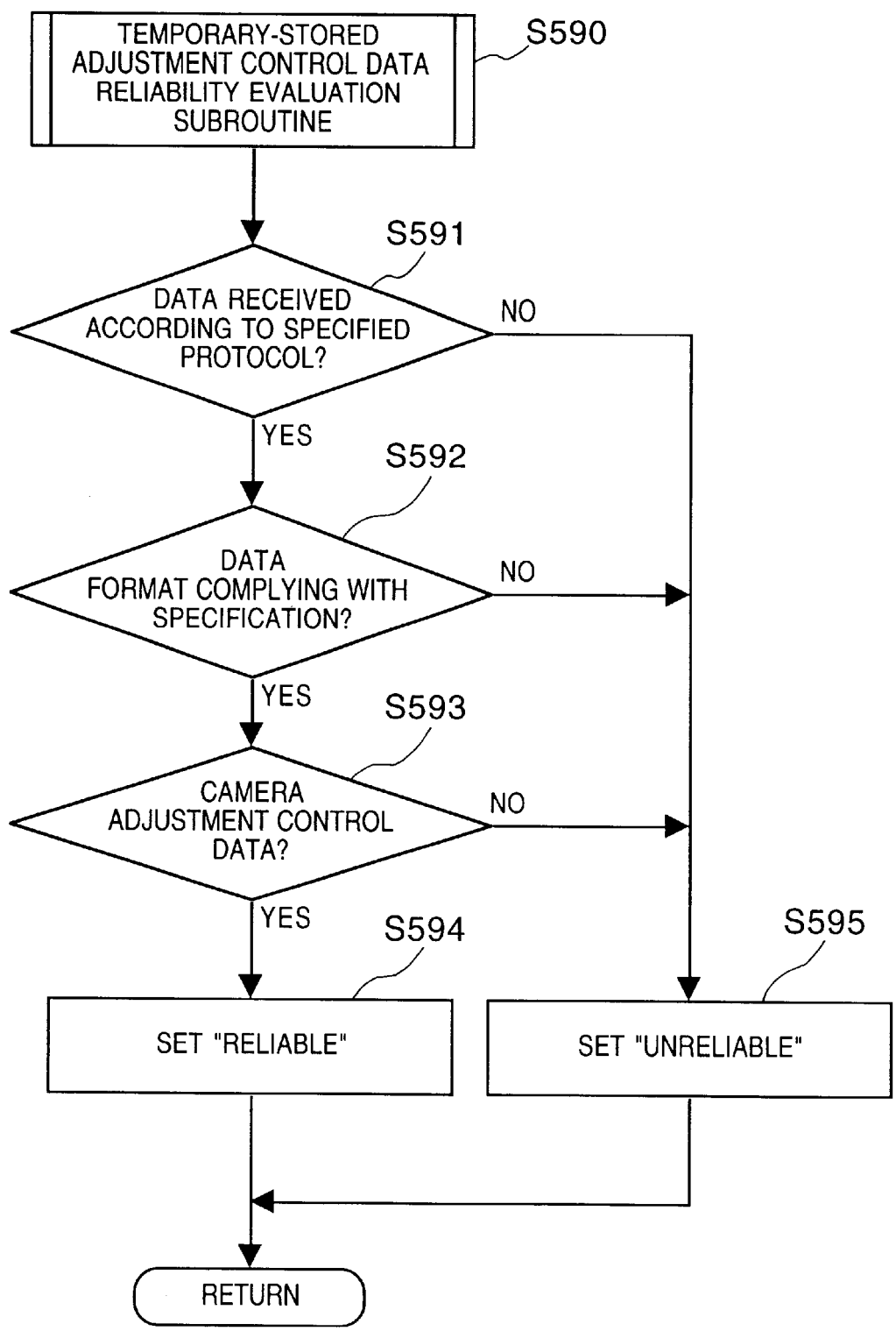

FIGS. 7A and 7B are flowcharts showing operation of the video camera 50 and PC 103 according to a third embodiment of the present invention. Note that the video camera 50 and PC 103 have the same construction as that shown in FIG. 1.

In the third embodiment, since operation of the PC 103 is the same as that described in the first embodiment with reference to FIG. 5A, the description will be omitted. Moreover, besides the processing in a case of a communication error during the PC-mode operation (i.e., control proceeding to NO in steps S520 or 523, or YES in step S521), since operation of the video camera 50 is the same as that described in the second embodiment with reference to FIG. 6A, the same step numbers are assigned and description thereof will be omitted. Hereinafter, the processing in a case of a communication error is described with reference to FIGS. 7A and 7B.

When a communication error is detected during the PC-mode operation in steps S520, S521 or S523 shown in FIG. 6A, the control proceeds to the subroutine in step S590 in FIG. 7A where reliability of the temporary-stored adjustment data is determined.

More specifically, in step S591 in FIG. 7B, it is determined whether or not the adjustment data has been received according to a specified protocol. If YES, it is determined in step S592 whether or not the data format complies with the specification. If YES in step S592, it is determined in step S593 whether or not the data is adjustment control data for the camera. If YES in step S593, "reliable" is set in step S594. If NO is determined in any of the steps S591 to S593, "unreliable" is set in step S595 and the control returns to the processing in FIG. 7A.

In step S586, if the result of the foregoing reliability evaluation subroutine is "reliable," the adjustment control data which has been temporarily stored up to this point in the adjustment control data temporary area 70 is stored in the adjustment data storage area 72 of the EEPROM shown in FIG. 1 as final adjustment data in step S587, then the control returns to step S567. If the result is "unreliable" in step S586, the camera control command counter 79 and adjustment control data temporary storage area 70 are initialized in step S584. In this manner, received camera control commands are all nulled without being transferred to the adjustment data storage area 72, and then the control returns to step S567 for performing operation not complying with the command from the PC 103, i.e., normal image sensing operation.

As has been described above, when a communication error is detected, if the control data which has been stored in the temporary storage area up to this point is unreliable control data, all data is cleared, but if the control data stored is reliable data, the control data temporarily stored is transferred to a non-volatile memory. By virtue of this, even if a communication error occurs, an electronic device can be normally controlled. In addition, recovery processing after occurrence of a communication error is realized.

Note that the present invention may be realized by hardware. Furthermore, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program cods constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, the standard control data storage area 71 of the ROM, where standard control data is stored, also constitutes the storage medium according to the present invention.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts described in FIGS. 5A to 7B explained in the first to third embodiments.

The present invention is not limited to the above embodiments and various changes and modifications can be made within the spirit and scope of the present invention. Therefore, to apprise the public of the scope of the present invention, the following claims are made.

What is claimed is:

1. An electronic device comprising:
   communication means for communicating with an external control apparatus;
   a control target to be controlled by the external control apparatus based on control data;
   first memory for temporarily storing the control data from the external control apparatus;
   second memory for storing the control data stored in said first memory;
   third memory for storing predetermined standard data of control data;
   error detection means for detecting a communication error occurred in communication with the external control apparatus; and
   control means for deleting the control data stored in said first memory when the communication error is detected, and controlling said control target based on the control data stored in said second memory or the predetermined standard data stored in said third memory.

2. The electronic device according to claim 1, wherein said error detection means determines the communication error when non-connection of the external control apparatus is detected.

3. The electronic device according to claim 1, wherein said error detection means detects the error communication when non-connection of a communication cable is detected.

4. The electronic device according to claim 1, wherein said error detection means detects the communication error when communication bus reset is detected.

5. An electronic device comprising:
   communication means for communicating with an external control apparatus;
   a control target to be controlled by the external control apparatus based on control data;
   first memory for temporarily storing the control data from the external control apparatus;
   second memory for storing the control data stored in said first memory;
   third memory for storing predetermined standard data of control data;
   a counter for counting a number of items of the control data transmitted by the external control apparatus;
   comparison means for comparing a counter value with a threshold value;
   error detection means for detecting a communication error occurred in communication with the external control apparatus; and
   control means for deleting the control data stored in said first memory or transferring the control data stored in said first memory to said second memory in accordance with a comparison result of said comparison means when the communication error is detected, and controlling said control target based on the control data stored in said second memory or the predetermined standard data stored in said third memory.

6. The electronic device according to claim 5, wherein as a result of the comparison by said comparison means, when the counter value is smaller than the threshold value, said control means deletes the control data stored in said first memory, whereas when the counter value is equal to or larger than the threshold value, said control means transfers the control data stored in said first memory to said second memory.

7. An electronic device comprising:
   communication means for communicating with an external control apparatus;
   a control target to be controlled by the external control apparatus based on control data;
   first memory for temporarily storing the control data from the external control apparatus;
   second memory for storing the control data stored in said first memory;
   third memory for storing predetermined standard data of control data;
   determination means for determining reliability of the control data stored in said first memory;
   error detection means for detecting a communication error; and
   control means for deleting the control data stored in said first memory or transferring the control data stored in said first memory to said second memory in accordance with a determination result of said determination means when the communication error is detected, and controlling said control target based on the control data stored in said second memory or the predetermined standard data stored in said third memory.

8. The electronic device according to claim 7, wherein said determination means determines the control data reliable when a protocol at the time of control data reception is valid.

9. The electronic device according to claim 7, wherein said determination means determines the control data reliable when a format of the control data is valid.

10. The electronic device according to claim 7, wherein said determination means determines the control data reliable when an attribute of the control data matches with an attribute of said electronic device.

11. A control method of an electronic device having first memory which stores predetermined standard data of control data for a control target, said method comprising:
   a communication step of communicating with an external control apparatus;
   a first storage step of temporarily storing control data from the external control apparatus in second memory;
   an error determination step of determining whether or not an error has occurred in communication with the external control apparatus;
   a second storage step of storing the control data, stored in the second memory, in third memory, when determination is made in said error determination step that no communication error has occurred; and
   a control step of deleting the control data stored in the second memory when determination is made in said error determination step that a communication error has occurred, and controlling the control target based on the control data stored in the third memory or the predetermined standard data stored in the first memory.

12. The control method according to claim 11, wherein in said error determination step, a communication error is determined when non-connection of the external control apparatus is detected.

13. The control method according to claim 11, wherein in said error determination step, a communication error is determined when non-connection of a communication cable is detected.

14. The control method according to claim 11, wherein in said error determination step, a communication error is determined when communication bus reset is detected.

15. A control method of an electronic device having first memory which stores predetermined standard data of control data for a control target, said method comprising:
   a communication step of communicating with an external control apparatus;
   a first storage step of temporarily storing control data from the external control apparatus in second memory;
   a counting step of counting a number of items of the control data transmitted by the external control apparatus;
   a comparison step of comparing a counter value with a threshold value;
   an error determination step of determining whether or not an error has occurred in communication with the external control apparatus;
   a second storage step of storing the control data, stored in the second memory, in third memory, when determination is made in said error determination step that no communication error has occurred; and
   a control step of deleting the control data stored in the second memory or transferring the control data stored in the second memory to the third memory in accordance with a comparison result of said comparison step when determination is made in said error determination step that a communication error has occurred, and controlling the control target based on the control data stored in the third memory or the predetermined standard data stored in the first memory.

16. The control method according to claim 15, wherein as a result of the comparison in said comparison step, when the counter value is smaller than the threshold value, the control data stored in the second memory is deleted in said control step, whereas when the counter value is equal to or larger than the threshold value, the control data stored in the second memory is stored in the third memory in said control step.

17. A control method of an electronic device having first memory which stores predetermined standard data of control data for a control target, said method comprising:
   a communication step of communicating with an external control apparatus;
   a first storage step of temporarily storing control data from the external control apparatus in second memory;
   a reliability determination step of determining reliability of the control data stored in the second memory;
   an error determination step of determining whether or not an error has occurred in communication with the external control apparatus;
   a second storage step of storing the control data, stored in the second memory, in third memory, when determination is made in said error determination step that no communication error has occurred; and
   a control step of deleting the control data stored in the second memory or transferring the control data stored in the second memory to the third memory in accordance with a determination result of said reliability determination step when determination is made in said error determination step that a communication error has occurred, and controlling the control target based on the control data stored in the third memory or the predetermined standard data stored in the first memory.

18. The control method according to claim 17, wherein in said determination step, the control data is determined reliable when a protocol at the time of control data reception is valid.

19. The control method according to claim 17, wherein in said determination step, the control data is determined reliable when a format of the control data is valid.

20. The control method according to claim 17, wherein in said determination step, the control data is determined reliable when an attribute of the control data matches with an attribute of said electronic device.

21. A computer program product comprising a computer usable medium having computer readable program code means embodied in said medium for a control method of an electronic device having first memory which stores predetermined standard data of control data for a control target, said product including:
   first computer readable program code means for communicating with an external control apparatus;
   second computer readable program code means for temporarily storing control data from the external control apparatus in second memory;
   third computer readable program code means for determining whether or not an error has occurred in communication with the external control apparatus;
   fourth computer readable program code means for storing the control data, stored in the second memory, in third memory, when determination is made that no communication error has occurred; and fifth computer readable program code means for deleting the control data stored in the second memory when determination is made that a communication error has occurred, and controlling the control target based on the control data stored in the third memory or the predetermined standard data stored in the first memory.

22. A computer program product comprising a computer usable medium having computer readable program code means embodied in said medium for a control method of an electronic device having first memory which stores predetermined standard data of control data for a control target, said product including:

first computer readable program code means for communicating with an external control apparatus;

second computer readable program code means for temporarily storing control data from the external control apparatus in second memory;

third computer readable program code means for counting a number of items of the control data transmitted by the external control apparatus;

fourth computer readable program code means for comparing a counter value with a threshold value;

fifth computer readable program code means for determining whether or not an error has occurred in communication with the external control apparatus;

sixth computer readable program code means for storing the control data, stored in the second memory, in third memory, when determination is made that no communication error has occurred; and seventh computer readable program code means for deleting the control data stored in the second memory or transferring the control data stored in the second memory to the third memory in accordance with a comparison result of said comparison step when determination is made that a communication error has occurred, and controlling the control target based on the control data stored in the third memory or the predetermined standard data stored in the first memory.

23. A computer program product comprising a computer usable medium having computer readable program code means embodied in said medium for a control method of an electronic device having first memory which stores predetermined standard data of control data for a control target, said product including:

first computer readable program code means for communicating with an external control apparatus;

second computer readable program code means for temporarily storing control data from the external control apparatus in second memory;

third computer readable program code means for determining reliability of the control data stored in the second memory;

fourth computer readable program code means for determining whether or not an error has occurred in communication with the external control apparatus;

fifth computer readable program code means for storing the control data, stored in the second memory, in third memory, when determination is made that no communication error has occurred; and sixth computer readable program code means for deleting the control data stored in the second memory or transferring the control data stored in the second memory to the third memory in accordance with a determination result of said reliability determination step when determination is made that a communication error has occurred, and controlling the control target based on the control data stored in the third memory or the predetermined standard data stored in the first memory.

24. An electronic device comprising:

a communication unit which communicates with an external control apparatus;

a control target to be controlled by the external control apparatus based on control data;

first memory which temporarily stores the control data from the external control apparatus;

second memory which stores the control data stored in said first memory;

third memory which stores predetermined standard data of control data;

an error detection unit which detects a communication error occurred in communication with the external control apparatus; and a controller which deletes the control data stored in said first memory when the communication error is detected, and controls said control target based on the control data stored in said second memory or the predetermined standard data stored in said third memory.

25. An electronic device comprising:

a communication unit which communicates with an external control apparatus;

a control target to be controlled by the external control apparatus based on control data;

first memory which temporarily stores the control data from the external control apparatus;

second memory which stores the control data stored in said first memory;

third memory which stores predetermined standard data of control data;

a counter which counts a number of items of the control data transmitted by the external control apparatus;

a comparison unit which compares a counter value with a threshold value;

an error detection unit which detects a communication error occurred in communication with the external control apparatus; and a controller which deletes the control data stored in said first memory or transfers the control data stored in said first memory to said second memory in accordance with a comparison result of said comparison unit when the communication error is detected, and controls said control target based on the control data stored in said second memory or the predetermined standard data stored in said third memory.

26. An electronic device comprising:

a communication unit which communicates with an external control apparatus;

a control target to be controlled by the external control apparatus based on control data;

first memory which temporarily stores the control data from the external control apparatus;

second memory which stores the control data stored in said first memory;

third memory which stores predetermined standard data of control data;

a determination unit which determines reliability of the control data stored in said first memory;

an error detection unit which detects a communication error; and a controller which deletes the control data stored in said first memory or transfers the control data stored in said first memory to said second memory in accordance with a comparison result of said determination unit when the communication error is detected, and controls said control target based on the control data stored in said second memory or the predetermined standard data stored in said third memory.

27. An electronic device comprising:

communication means for communicating with an external control apparatus;

a control target to be controlled based on control data;

memory for storing a first control data from the external control apparatus and a second control data stored in advance as a standard control data;

error detection means for detecting a communication error occurred in communication with the external control apparatus; and control means for controlling said control target based on the first control data or the second control data when the communication error is detected.

28. An electronic device comprising:

communication means for communicating with an external control apparatus;

a control target to be controlled based on control data;

memory for storing a first control data from the external control apparatus and a second control data stored in advance as a standard control data;

a counter for counting a number of items of the first control data transmitted by the external control apparatus;

comparison means for comparing a counter value with a threshold value;

error detection means for detecting a communication error occurred in communication with the external control apparatus; and control means for controlling said control target based on the first control data or the second control data in accordance with a comparison result of said comparison means when the communication error is detected.

29. An electronic device comprising:

communication means for communicating with an external control apparatus;

a control target to be controlled based on control data;

memory for storing a first control data from the external control apparatus and a second control data stored in advance as a standard control data;

determination means for determining reliability of the first control data;

error detection means for detecting a communication error occurred in communication with the external control apparatus; and control means for controlling said control target based on the first control data or the second control data in accordance with a determination result of said determination means when the communication error is detected.

30. An electronic device comprising:

a communication unit which communicates with an external control apparatus;

first memory which temporarily stores the control data from the external control apparatus;

second memory which stores the control data stored in said first memory when a predetermined item is included in the control data;

a control target which is controlled based on the control data from the external control apparatus or the control data read out from said second memory;

an error detection unit which detects a communication error occurred in communication with the external control apparatus; and a control unit which deletes the control data stored in said first memory when the communication error is detected.

31. The electronic device according to claim 30, wherein the predetermined item is the predetermined ordinal number item in the order of items configuring the control data from the external control apparatus.

32. The electronic device according to claim 30, wherein the predetermined item is a last item in the order of items configuring the control data from the external control apparatus.

33. The electronic device according to claim 30 further comprising third memory which stores a standard value of the control data, wherein said control unit controls the control target based on the control data stored in said third memory when the communication error is detected.

34. An electronic device comprising:

a communication unit that communicates with an external control apparatus;

a control target that is controlled based on control data from the external control apparatus;

first memory that temporarily stores the control data from the external control apparatus;

second memory that stores the control data stored in said first memory;

a counter that counts the number of received items in the control data from the external control apparatus;

a comparison unit that compares the counted number with a threshold value;

an error detection unit that detects a communication error occurred in communication with the external control apparatus; and a control unit that deleting the control data stored in said first memory or transfers the control data stored in said first memory to said second memory depending upon the comparison result at the time when the communication error is detected.

35. An electronic device comprising;

a communication unit that communicates with an external control apparatus;

a control target that is controlled based on control data from the external control apparatus;

a first memory that temporarily stores the control data from the external control apparatus;

second memory that stores the control data stored in said first memory;

a determination unit that determines reliability of the control data stored in said first memory;

an error detection unit that detects a communication error occurred in communication with the external control apparatus; and a control unit that deleting the control data stored in said first memory or transfers the control data stored in said first memory to said second memory depending upon the determination result at the time when the communication error is detected.

36. The electronic device according to claim 35, wherein said determination unit determines the reliability of the control data based on validity of protocol at the time when the control data is received.

37. The electronic device according to claim 35, wherein said determination unit determines the reliability of the control data by determining validity of a format of the control data.

38. The electronic device according to claim 35, wherein said determination unit determines the reliability of the control data by determining validity of attributes of the control data.

39. A control method of an electronic device comprising:

communicating with an external control apparatus;

temporarily storing control data from the external control apparatus in first memory;

storing in second memory the control data stored in the first memory when a predetermined item is included in the control data;

detecting a communication error occurred in communication with the external control apparatus;

controlling a control target based on the control data from the external control apparatus or the control data read out from the second memory; and deleting the control data stored in the first memory when the communication error is detected.

40. The control method according to claim 39, wherein the predetermined item is the predetermined ordinal number item in the order of items configuring the control data from the external control apparatus.

41. The control method according to claim 39, wherein the predetermined item is a last item in the order of items configuring the control data from the external control apparatus.

42. The control method according to claim 39 further storing in third memory a standard value of the control data, wherein the control target is controlled based on the control data stored in the third memory when the communication error is detected.

43. A control method of an electronic device comprising:

communicating with an external control apparatus;

temporarily storing control data from the external control apparatus in first memory;

storing in second memory the control data stored in the first memory;

counting the number of received items in the control data from the external control apparatus;

comparing the counted number with a threshold value;

detecting a communication error occurred in communication with the external control apparatus;

controlling a control target based on the control data from the external control apparatus; and deleting the control data stored in the first memory or transfers the control data stored in the first memory to the second memory depending upon the comparison result at the time when the communication error is detected.

44. A control method of an electronic device comprising:

communicating with an external control apparatus;

temporarily storing control data from the external control apparatus;

stores in second memory the control data stored in the first memory;

determining reliability of the control data stored in the first memory;

detecting a communication error occurred in communication with the external control apparatus;

controlling a control target based on the control data from the external control apparatus; and deleting the control data stored in the first memory or transfers the control data stored in the first memory to said second memory depending upon the determination result at the time when the communication error is detected.

45. The control method according to claim 44, wherein the reliability of the control data is determined based on validity of protocol at the time when the control data is received.

46. The control method according to claim 44, wherein the reliability of the control data is determined by determining validity of a format of the control data.

47. The control method according to claim 44, wherein the reliability of the control data is determined by determining validity of attributes of the control data.

* * * * *

UNITED STATES PATENT AND TRADEMARK OFFICE
CERTIFICATE OF CORRECTION

PATENT NO. : 6,816,993 B1
DATED : November 9, 2004
INVENTOR(S) : Furuyama

It is certified that error appears in the above-identified patent and that said Letters Patent is hereby corrected as shown below:

Title page,
Item [56], References Cited, FOREIGN PATENT DOCUMENTS, please add
-- JP 06-019729    1/1994 --

Signed and Sealed this

Thirty-first Day of May, 2005

JON W. DUDAS
*Director of the United States Patent and Trademark Office*